United States Patent
Hampel et al.

(10) Patent No.: US 10,873,479 B2
(45) Date of Patent: Dec. 22, 2020

(54) TECHNIQUES AND APPARATUSES FOR FORWARDING IN MULTI-HOP WIRELESS NETWORKS VIA MULTI-LAYER TUNNELING AND CENTRALIZED CONTROL

(71) Applicant: QUALCOMM Incorporated, San Diego, CA (US)

(72) Inventors: Karl Georg Hampel, Hoboken, NJ (US); Junyi Li, Chester, NJ (US); Hong Cheng, Bridgewater, NJ (US); Navid Abedini, Raritan, NJ (US); Sundar Subramanian, San Diego, CA (US); Muhammad Nazmul Islam, Edison, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/027,976

(22) Filed: Jul. 5, 2018

(65) Prior Publication Data
US 2019/0044754 A1    Feb. 7, 2019

Related U.S. Application Data

(60) Provisional application No. 62/541,007, filed on Aug. 3, 2017.

(51) Int. Cl.
*H04L 12/46* (2006.01)
*H04B 7/155* (2006.01)
(Continued)

(52) U.S. Cl.
CPC ......... *H04L 12/4633* (2013.01); *H04B 7/155* (2013.01); *H04B 7/15528* (2013.01);
(Continued)

(58) Field of Classification Search
CPC ....... H04B 7/155; H04B 7/2606; H04L 12/06; H04L 12/4633; H04L 29/12; H04L 41/08;
(Continued)

(56) References Cited

U.S. PATENT DOCUMENTS 9,596,053 B1 * 3/2017 Marupaduga et al.
2010/0103863 A1 * 4/2010 Ulupinar et al.
(Continued)

FOREIGN PATENT DOCUMENTS

| WO | 2010118426 A2 | 10/2010 |
|----|---------------|---------|
| WO | 2013144714 A2 | 10/2013 |
| WO | 2014179960 A1 | 11/2014 |

OTHER PUBLICATIONS

Ghazali N.E., et al., "Handover Signaling for 3 Alternatives of Layer 3 Relay Node Implementation in LTE-advanced", Apr. 10, 2012, XP055509045, Retrieved from the Internet: https://www.researchgate.net/publication/236170248_Handover_Signaling_for_3_Alternatives_of_Layer_3_ . . . [retrieved on Sep. 24, 2018], pp. 1-8.

(Continued)

*Primary Examiner* — Marsha D Banks Harold
*Assistant Examiner* — Dharmesh J Patel
(74) *Attorney, Agent, or Firm* — Harrity & Harrity, LLP

(57) ABSTRACT

Certain aspects of the present disclosure generally relate to wireless communication. In some aspects, a wireless communication relay may receive configuration information identifying a first mapping between a first radio bearer and a first tunnel identifier; obtain a second mapping between a second radio bearer and at least one of the first radio bearer or the first tunnel identifier; and/or transmit data, received on the first radio bearer, on the second radio bearer, wherein the data is transmitted with the first tunnel identifier. Numerous other aspects are provided.

30 Claims, 15 Drawing Sheets

(51) Int. Cl.
  *H04W 88/04* (2009.01)
  *H04W 76/11* (2018.01)
  *H04W 76/15* (2018.01)
  *H04W 76/12* (2018.01)
  *H04B 7/26* (2006.01)
  *H04L 12/24* (2006.01)
  *H04W 76/27* (2018.01)

(52) U.S. Cl.
  CPC ........... *H04B 7/2606* (2013.01); *H04L 41/08* (2013.01); *H04W 76/11* (2018.02); *H04W 76/12* (2018.02); *H04W 76/15* (2018.02); *H04W 88/04* (2013.01); *H04L 41/0893* (2013.01); *H04W 76/27* (2018.02)

(58) Field of Classification Search
  CPC .......... H04L 69/04; H04L 69/22; H04W 8/26; H04W 16/26; H04W 28/0263; H04W 40/22; H04W 72/1263; H04W 76/12; H04W 80/04; H04W 84/047; H04W 88/04; H04W 88/08; H04W 92/20
  See application file for complete search history.

(56) References Cited

U.S. PATENT DOCUMENTS

2010/0226314 A1* 9/2010 Xu
2011/0103294 A1* 5/2011 Liu et al.
2013/0136078 A1* 5/2013 Bucknell et al.

OTHER PUBLICATIONS

International Search Report and Written Opinion—PCT/US2018/041039—ISA/EPO—dated Oct. 2, 2018 (175644WO).

* cited by examiner

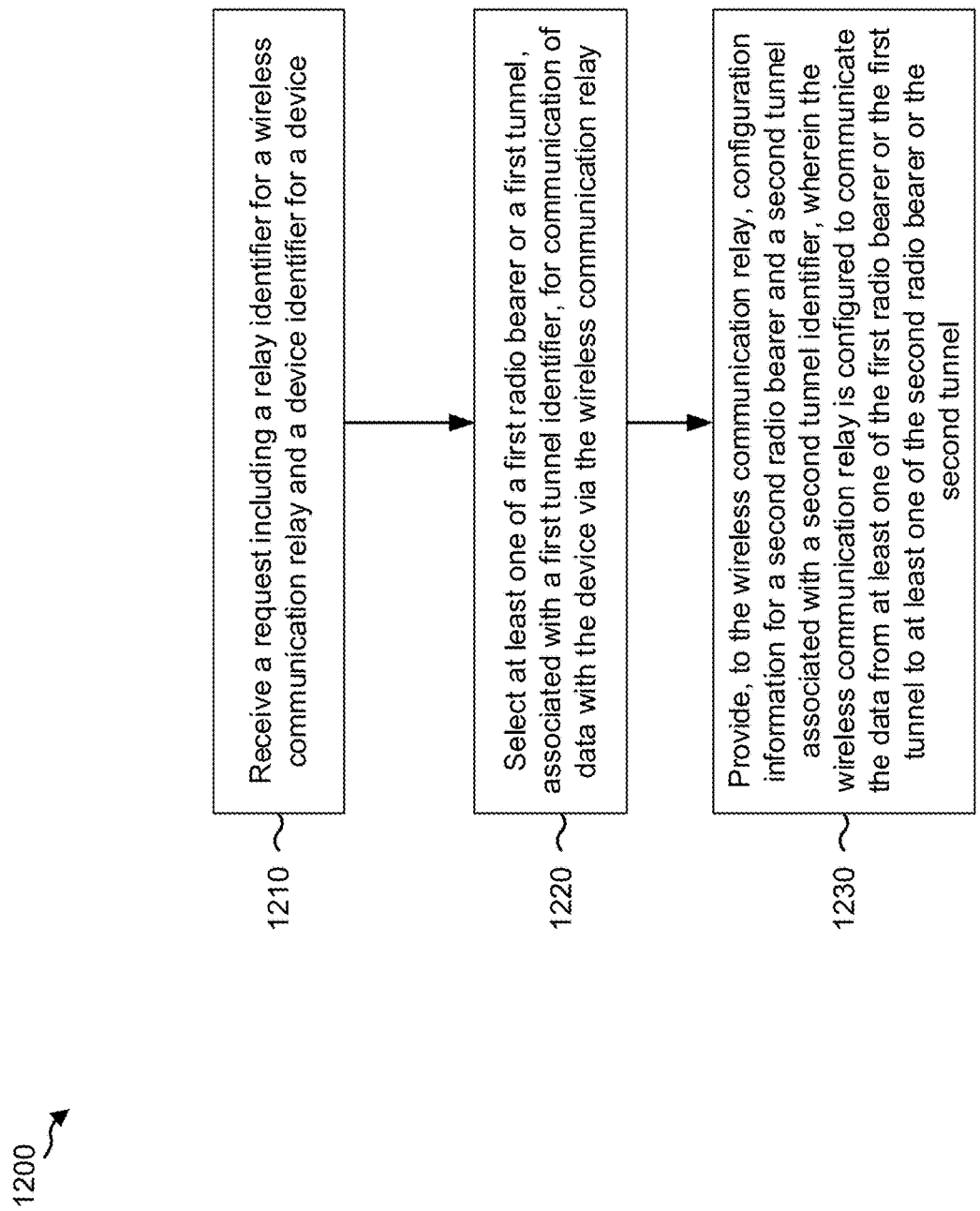

TECHNIQUES AND APPARATUSES FOR FORWARDING IN MULTI-HOP WIRELESS NETWORKS VIA MULTI-LAYER TUNNELING AND CENTRALIZED CONTROL

CROSS-REFERENCE TO RELATED APPLICATIONS UNDER 35 U.S.C. § 119

This application claims priority to Provisional Patent Application No. 62/541,007, filed on Aug. 3, 2017, entitled "TECHNIQUES AND APPARATUSES FOR FORWARDING IN MULTI-HOP WIRELESS NETWORKS VIA MULTI-LAYER TUNNELING AND CENTRALIZED CONTROL," which is hereby expressly incorporated by reference herein.

FIELD OF THE DISCLOSURE

Aspects of the present disclosure generally relate to wireless communication, and more particularly to techniques and apparatuses for forwarding in multi-hop wireless networks via multi-layer tunneling and centralized control.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a wireless communication relay may include receiving configuration information identifying a first mapping between a first radio bearer and a first tunnel identifier; obtaining a second mapping between a second radio bearer and at least one of the first radio bearer or the first tunnel identifier; and transmitting data, received on the first radio bearer, on the second radio bearer, wherein the data is transmitted with the first tunnel identifier.

In some aspects, a wireless communication relay for wireless communication may include one or more processors configured to receive configuration information identifying a first mapping between a first radio bearer and a first tunnel identifier; obtain a second mapping between a second radio bearer and at least one of the first radio bearer or the first tunnel identifier; and transmit data, received on the first radio bearer, on the second radio bearer, wherein the data is transmitted with the first tunnel identifier.

In some aspects, a non-transitory computer-readable medium may store one or more instructions for wireless communication. The one or more instructions, when executed by one or more processors of a wireless communication relay, may cause the one or more processors to receive configuration information identifying a first mapping between a first radio bearer and a first tunnel identifier; obtain a second mapping between a second radio bearer and at least one of the first radio bearer or the first tunnel identifier; and transmit data, received on the first radio bearer, on the second radio bearer, wherein the data is transmitted with the first tunnel identifier.

In some aspects, an apparatus for wireless communication may include means for receiving configuration information identifying a first mapping between a first radio bearer and a first tunnel identifier; means for obtaining a second mapping between a second radio bearer and at least one of the first radio bearer or the first tunnel identifier; and means for transmitting data, received on the first radio bearer, on the second radio bearer, wherein the data is transmitted with the first tunnel identifier.

In some aspects, a method for wireless communication performed by a network node may include receiving configuration information identifying a first flow identifier pertaining to a device, wherein the configuration information further identifies a first tunnel identifier associated with a first tunnel, and wherein the configuration information identifies at least one of a first radio bearer identifier associated with a first radio bearer or a second tunnel identifier associated with a second tunnel; and providing data, associated with the first flow identifier, in association with the first tunnel identifier and via the first radio bearer or the second tunnel to the device, based at least in part on the first radio bearer identifier or the second tunnel identifier.

In some aspects, a network node for wireless communication may include one or more processors configured to receive configuration information identifying a first flow identifier pertaining to a device, wherein the configuration information further identifies a first tunnel identifier associated with a first tunnel, and wherein the configuration information identifies at least one of a first radio bearer identifier associated with a first radio bearer or a second tunnel identifier associated with a second tunnel; and provide data, associated with the first flow identifier, in association with the first tunnel identifier and via the first radio bearer or the second tunnel to the device, based at least in part on the first radio bearer identifier or the second tunnel identifier.

In some aspects, a non-transitory computer-readable medium may store one or more instructions for wireless communication. The one or more instructions, when executed by one or more processors of a network node, may cause the one or more processors to receive configuration information identifying a first flow identifier pertaining to a device, wherein the configuration information further identifies a first tunnel identifier associated with a first tunnel, and wherein the configuration information identifies at least one of a first radio bearer identifier associated with a first radio bearer or a second tunnel identifier associated with a second tunnel; and provide data, associated with the first flow identifier, in association with the first tunnel identifier and via the first radio bearer or the second tunnel to the device, based at least in part on the first radio bearer identifier or the second tunnel identifier.

In some aspects, an apparatus for wireless communication may include means for receiving configuration information identifying a first flow identifier pertaining to a device, wherein the configuration information further identifies a first tunnel identifier associated with a first tunnel, and wherein the configuration information identifies at least one of a first radio bearer identifier associated with a first radio bearer or a second tunnel identifier associated with a second tunnel; and means for providing data, associated with the first flow identifier, in association with the first tunnel identifier and via the first radio bearer or the second tunnel to the device, based at least in part on the first radio bearer identifier or the second tunnel identifier.

In some aspects, a method for wireless communication performed by a network node may include receiving a request including a relay identifier for a wireless communication relay and a device identifier for a device; selecting at least one of a first radio bearer or a first tunnel, associated with a first tunnel identifier, for communication of data with the device via the wireless communication relay; and providing, to the wireless communication relay, configuration information for a second radio bearer and a second tunnel associated with a second tunnel identifier, wherein the wireless communication relay is configured to communicate the data from at least one of the first radio bearer or the first tunnel to at least one of the second radio bearer or the second tunnel.

In some aspects, a network node for wireless communication may include one or more processors configured to receive a request including a relay identifier for a wireless communication relay and a device identifier for a device; select at least one of a first radio bearer or a first tunnel, associated with a first tunnel identifier, for communication of data with the device via the wireless communication relay; and provide, to the wireless communication relay, configuration information for a second radio bearer and a second tunnel associated with a second tunnel identifier, wherein the wireless communication relay is configured to communicate the data from at least one of the first radio bearer or the first tunnel to at least one of the second radio bearer or the second tunnel.

In some aspects, a non-transitory computer-readable medium may store one or more instructions for wireless communication. The one or more instructions, when executed by one or more processors of a network node, may cause the one or more processors to receive a request including a relay identifier for a wireless communication relay and a device identifier for a device; select at least one of a first radio bearer or a first tunnel, associated with a first tunnel identifier, for communication of data with the device via the wireless communication relay; and provide, to the wireless communication relay, configuration information for a second radio bearer and a second tunnel associated with a second tunnel identifier, wherein the wireless communication relay is configured to communicate the data from at least one of the first radio bearer or the first tunnel to at least one of the second radio bearer or the second tunnel.

In some aspects, an apparatus for wireless communication may include means for receiving a request including a relay identifier for a wireless communication relay and a device identifier for a device; means for selecting at least one of a first radio bearer or a first tunnel, associated with a first tunnel identifier, for communication of data with the device via the wireless communication relay; and means for providing, to the wireless communication relay, configuration information for a second radio bearer and a second tunnel associated with a second tunnel identifier, wherein the wireless communication relay is configured to communicate the data from at least one of the first radio bearer or the first tunnel to at least one of the second radio bearer or the second tunnel.

Aspects generally include a method, apparatus, system, computer program product, non-transitory computer-readable medium, base station, wireless communication device, wireless communication relay, network node, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 12 is a diagram illustrating another example process performed, for example, by a network node, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
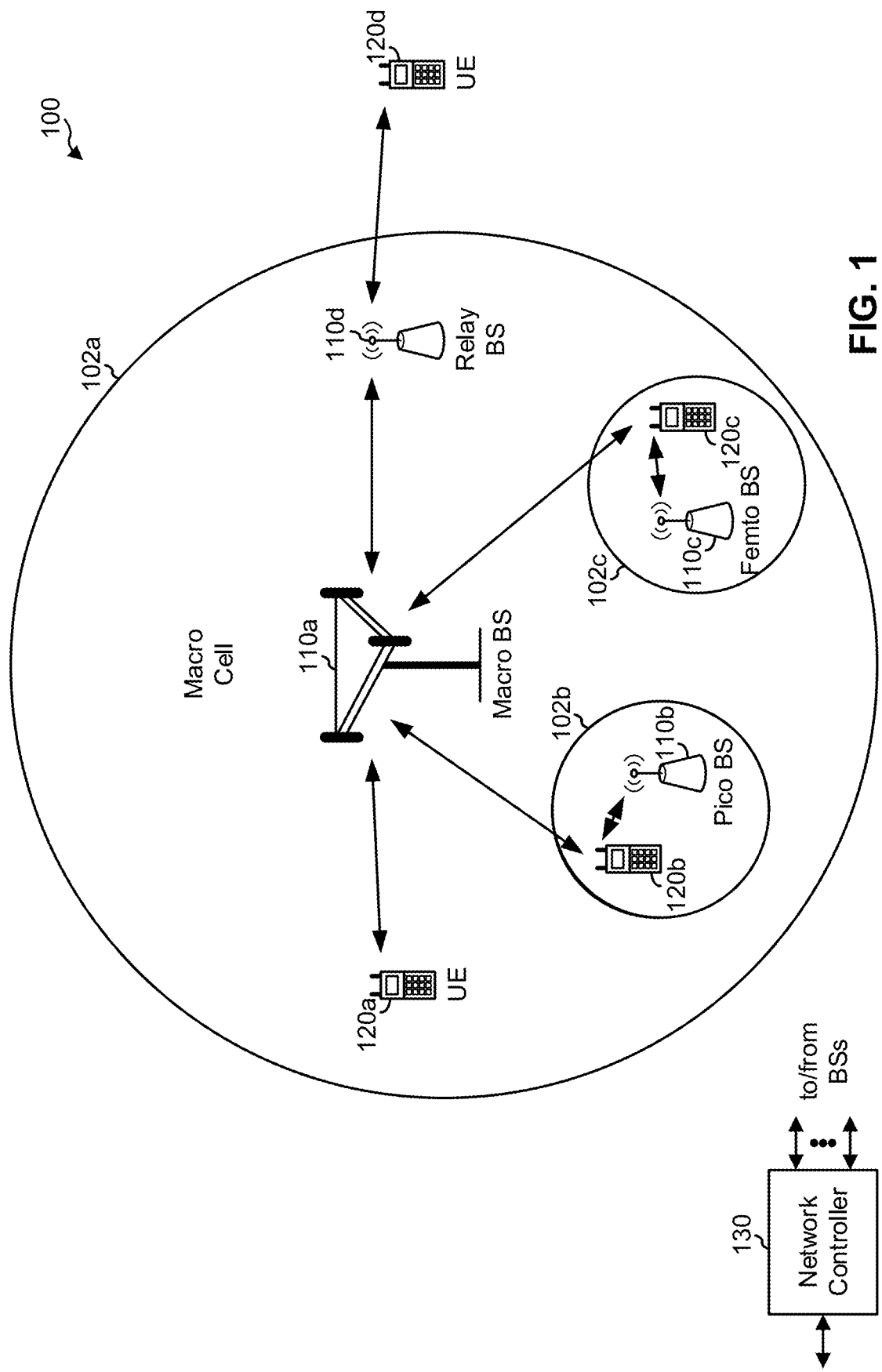
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
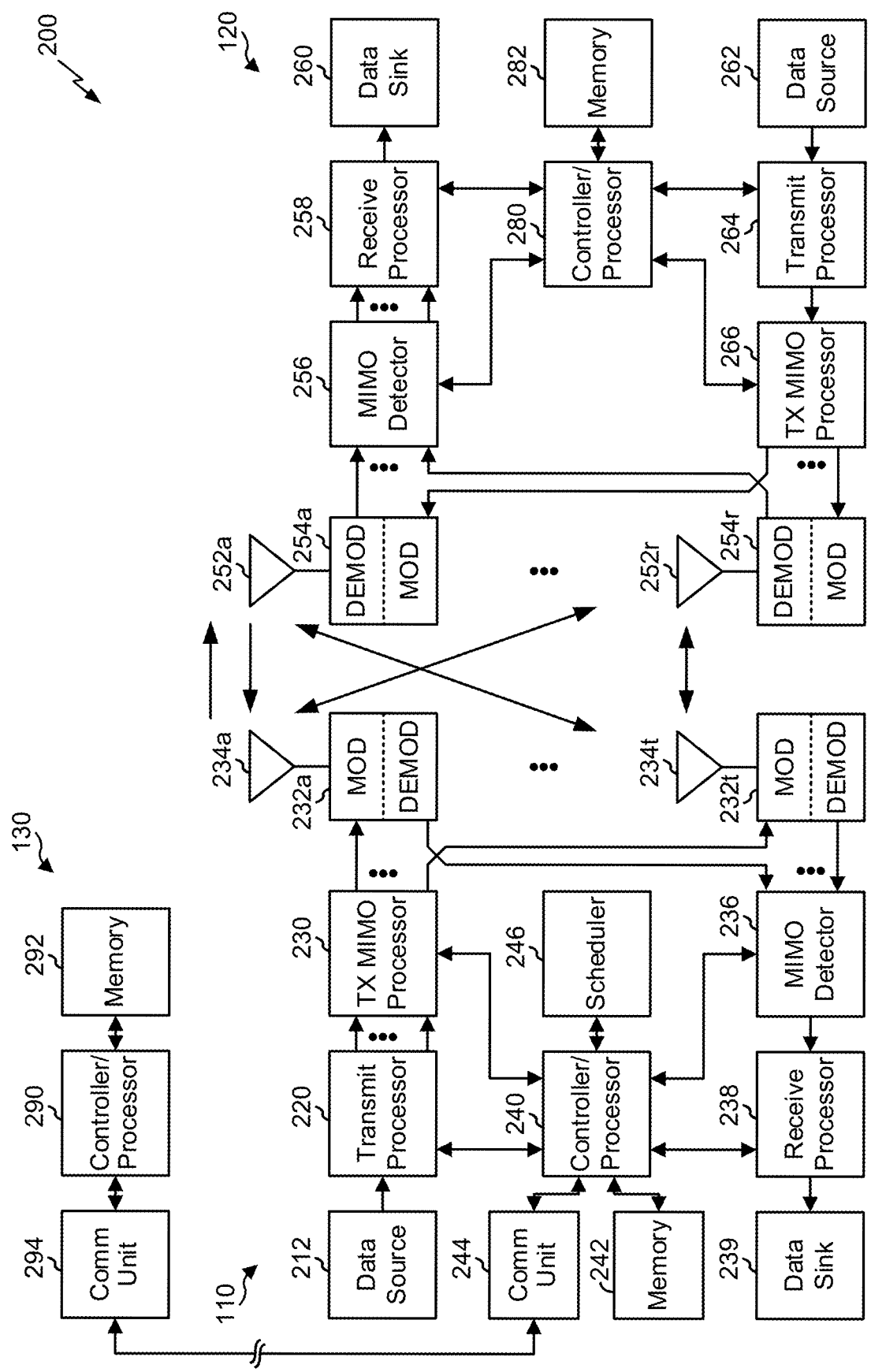
FIG. 2 shows a block diagram conceptually illustrating an example of a base station in communication with a user equipment (UE) in a wireless communication network, in accordance with certain aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform forwarding in multi-hop wireless networks via multi-layer tunneling and centralized control. For example, controller/processor 280 and/or other processors and modules at UE 120, or controller/process 240 and/or other processors and modules at BS 110, may perform or direct operations of UE 120 or BS 110 to perform forwarding in a multi-hop wireless network via multi-layer tunneling and centralized control. For example, controller/processor 240/280 and/or other controllers/processors and modules may perform or direct operations of, for example, process 1000 of FIG. 10, process 1100 of FIG. 11, process 1200 of FIG. 12, and/or other processes as described herein. In some aspects, one or more of the components shown in FIG. 2 may be employed to perform example process 1000, example process 1100, example process 1200, and/or other processes for the techniques described herein. Memories 242 and 282 may store data and program codes for base station 110 and UE 120, respectively. A scheduler 246 may schedule UEs for data transmission on the downlink and/or uplink.

In some aspects, UE 120 may include means for receiving configuration information identifying a first mapping between a first radio bearer and a first tunnel identifier, means for obtaining a second mapping between a second radio bearer and at least one of the first radio bearer or the first tunnel identifier, means for transmitting data, received on the first radio bearer, on the second radio bearer, means for forwarding second data on the first radio bearer, means for receiving second configuration information identifying a third mapping between a third radio bearer and a second tunnel identifier, means for obtaining a fourth mapping between the second radio bearer and the third radio bearer, means for receiving data on the third radio bearer, means for transmitting second data, received on the third radio bearer, on the second radio bearer, means for forwarding third data on the third radio bearer, means for receiving configuration information identifying a first flow identifier pertaining to a device, wherein the configuration information further identifies a first tunnel identifier associated with a first tunnel, and wherein the configuration information identifies at least one of a first radio bearer identifier associated with a first radio bearer or a second tunnel identifier associated with a second tunnel, means for providing data, associated with the first flow identifier, in association with the first tunnel identifier and via the first radio bearer or the second tunnel to the device, based at least in part on the first radio bearer identifier or the second tunnel identifier, means for obtaining second configuration information pertaining to a second flow identifier associated with the device, means for providing other data to the device based at least in part on the other data being associated with the second flow identifier, means for obtaining second configuration information for a second flow identifier, wherein the second flow identifier is associated with a second device, means for providing other data to the second device based at least in part on the other data being associated with the second flow identifier, means for receiving a request including a relay identifier for a wireless communication relay and a device identifier for a device, means for selecting at least one of a first radio bearer or a first tunnel, associated with a first tunnel identifier, for communication of data with the device via the wireless communication relay, means for providing, to the wireless communication relay, configuration information for a second radio bearer and a second tunnel associated with a second tunnel identifier, means for providing second configuration information identifying at least one of the first radio bearer or the first tunnel identifier, means for determining user-plane configuration information based at least in part on the configuration information, means for configuring communication of a user-plane central unit of the network node with at least one of the relay or the device using the user-plane configuration information, and/or the like. In some aspects, such means may include one or more components of UE 120 described in connection with FIG. 2.

In some aspects, base station 110 may include means for receiving configuration information identifying a first mapping between a first radio bearer and a first tunnel identifier, means for obtaining a second mapping between a second radio bearer and at least one of the first radio bearer or the first tunnel identifier, means for transmitting data, received on the first radio bearer, on the second radio bearer, means for forwarding second data on the first radio bearer, means for receiving second configuration information identifying a third mapping between a third radio bearer and a second tunnel identifier, means for obtaining a fourth mapping between the second radio bearer and the third radio bearer, means for receiving data on the third radio bearer, means for transmitting second data, received on the third radio bearer, on the second radio bearer, means for forwarding third data on the third radio bearer, means for receiving configuration information identifying a first flow identifier pertaining to a device, wherein the configuration information further identifies a first tunnel identifier associated with a first tunnel, and wherein the configuration information identifies at least one of a first radio bearer identifier associated with a first radio bearer or a second tunnel identifier associated with a second tunnel, means for providing data, associated with the first flow identifier, in association with the first tunnel identifier and via the first radio bearer or the second tunnel to the device, based at least in part on the first radio bearer identifier or the second tunnel identifier, means for obtaining second configuration information pertaining to a second flow identifier associated with the device, means for providing other data to the device based at least in part on the other data being associated with the second flow identifier, means for obtaining second configuration information for a second flow identifier, wherein the second flow identifier is associated with a second device, means for providing other data to the second device based at least in part on the other data being associated with the second flow identifier, means for receiving a request including a relay identifier for a wireless communication relay and a device identifier for a device, means for selecting at least one of a first radio bearer or a first tunnel, associated with a first tunnel identifier, for communication of data with the device via the wireless communication relay, means for providing, to the wireless communication relay, configuration information for a second radio bearer and a second tunnel associated with a second tunnel identifier, means for providing second configuration information identifying at least one of the first radio bearer or the first tunnel identifier, means for determining user-plane configuration information based at least in part on the configuration information, means for configuring communication of a user-plane central unit of the network node with at least one of the relay or the device using the user-plane configuration information, and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3:
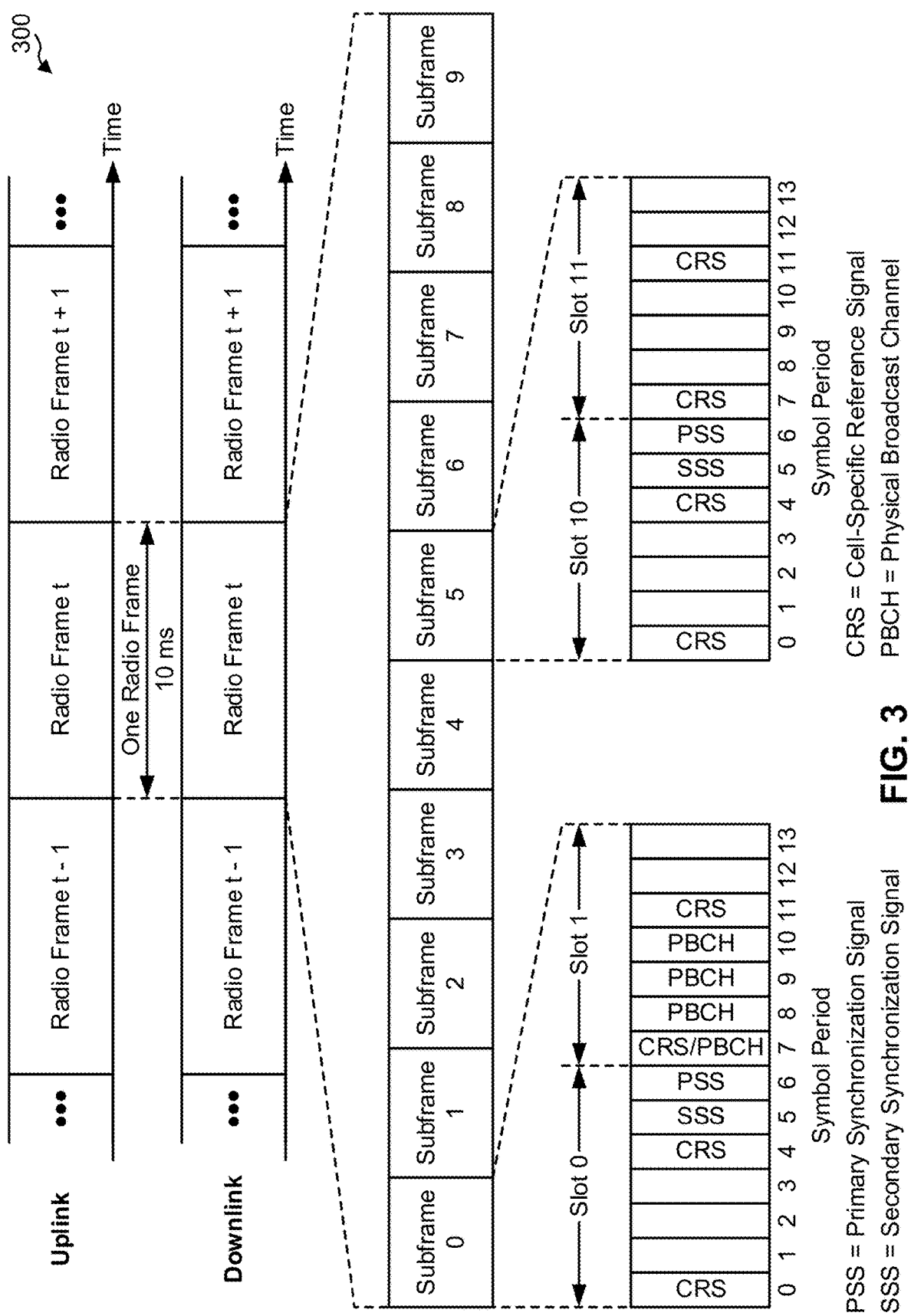
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
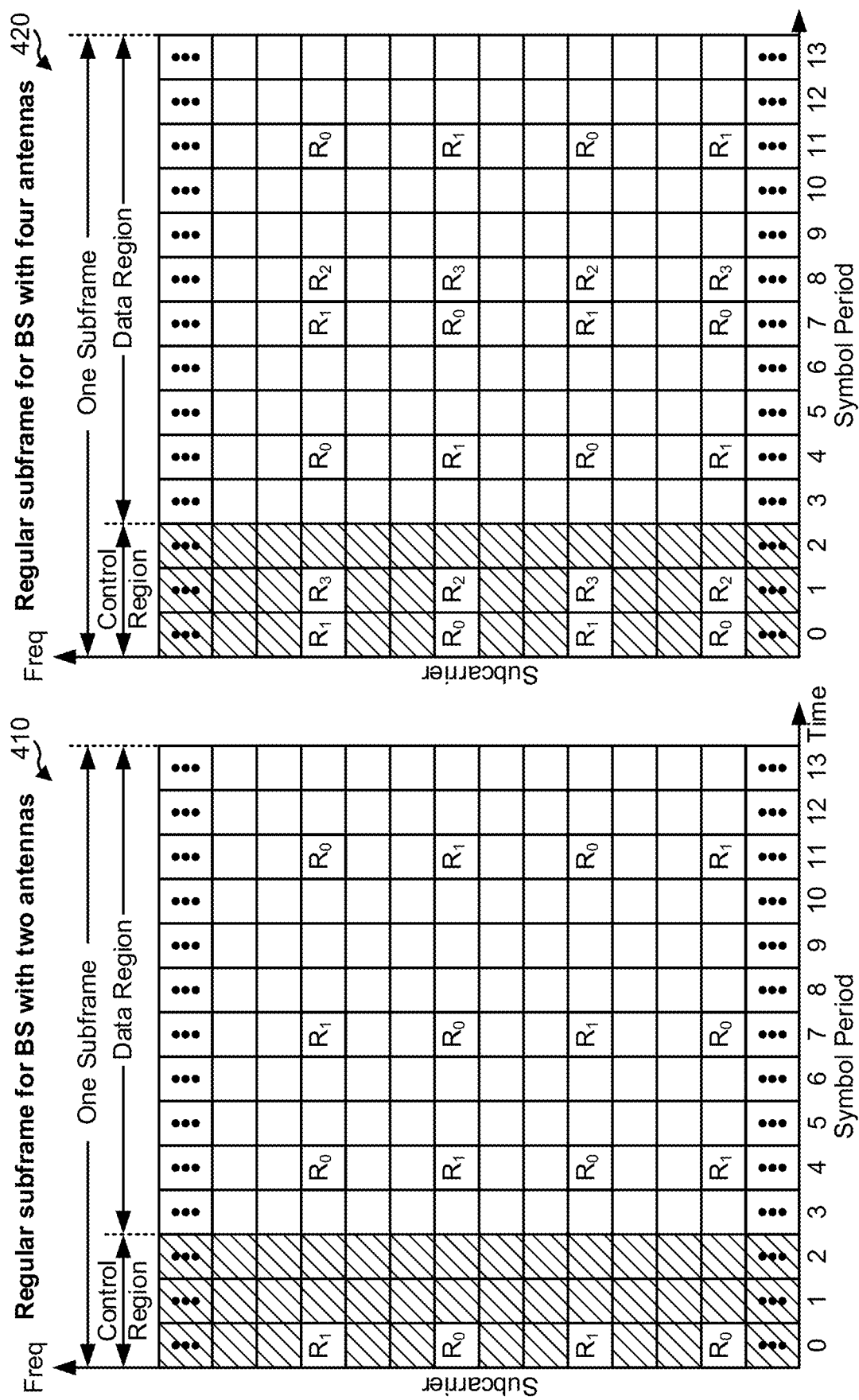
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
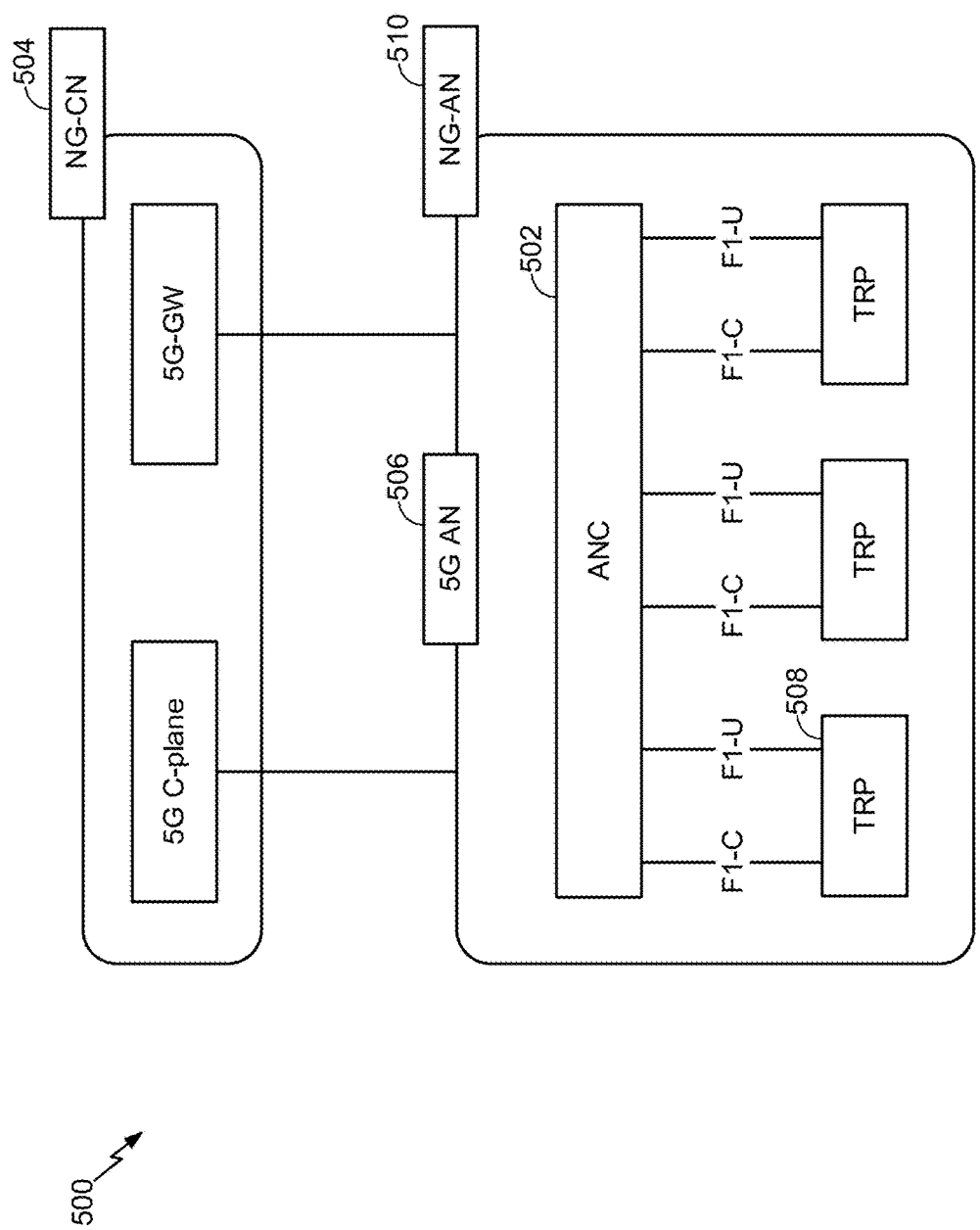
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6A:
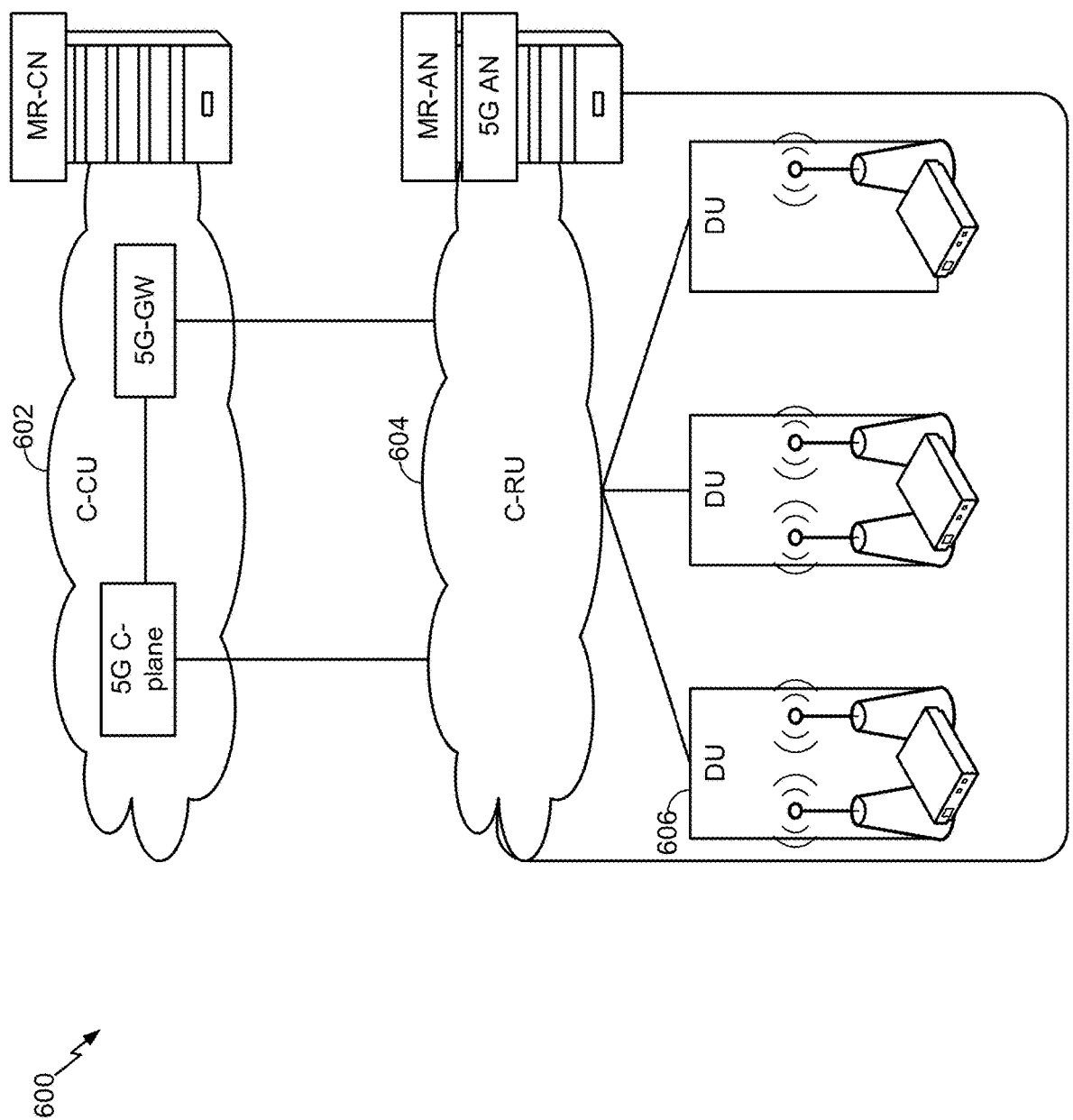
FIG. 6A illustrates an example physical architecture of a distributed RAN, in accordance with certain aspects of the present disclosure.
Figure 6B:
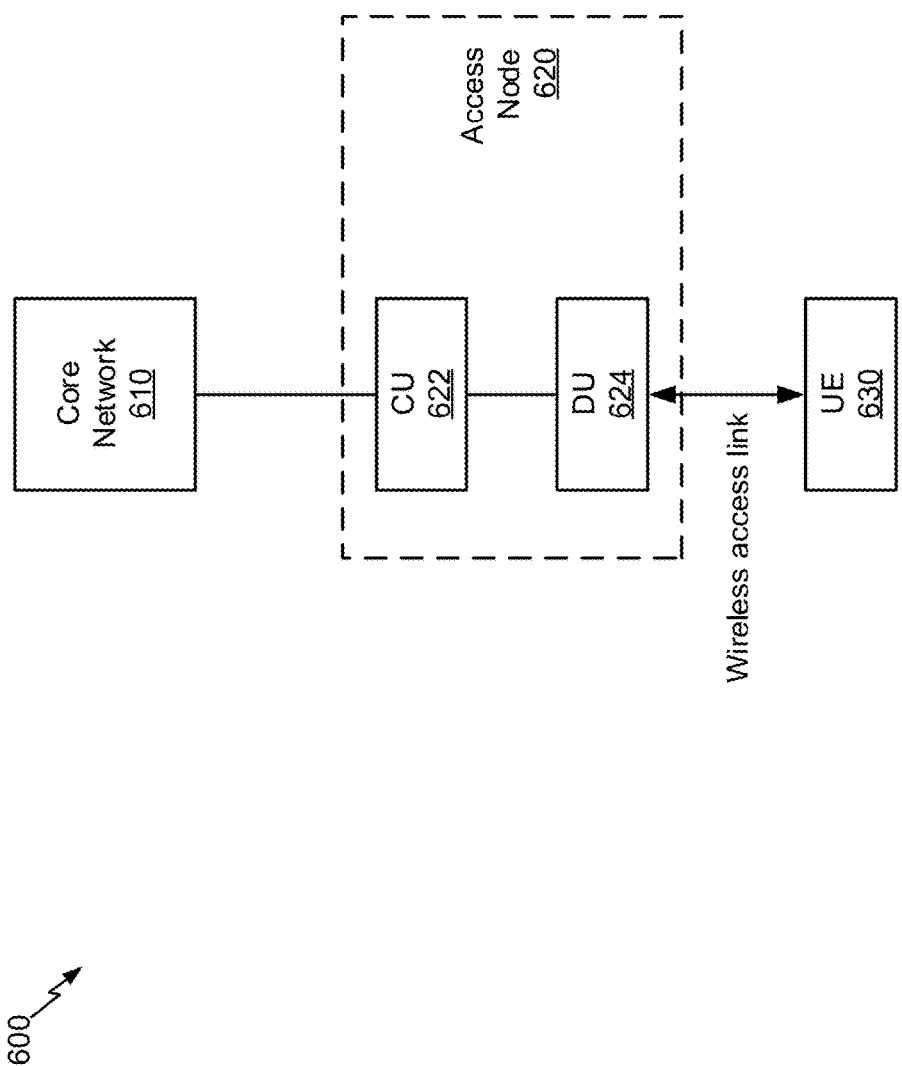
FIG. 6B illustrates an example architecture of a central unit-distributed unit (CU-DU) architecture for an access node, in accordance with certain aspects of the present disclosure.

FIGS. 6A and 6B illustrate an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

FIG. 6B illustrates an example architecture of a central unit-distributed unit (CU-DU) architecture for an access node, in accordance with certain aspects of the present disclosure. As shown in FIG. 6B, a core network 610 may communicate with a UE 630 via an access node 620. For example, the core network 610 may include an Evolved Packet Core (EPC) and/or the like. The UE 630 may be the UE 120.

The access node 620 may include a central unit (CU) 622 and a distributed unit (DU) 624. The CU 622 may perform centralized control functions, such as configuration, generation and implementation of mapping rules, tracking topology of the wireless backhaul or fronthaul network, caching mapping information, caching multi-tunnel encapsulation information, and/or the like. In some aspects, the CU 622 may include a user-plane CU function and a control-plane CU function. The control-plane CU function may provide a configuration or configuration information for the user-plane CU function. The control-plane CU function may communicate control-plane information with UE 630 and/or one or more wireless communication relays (described in more detail below) in a control plane. The user-plane CU function may communicate with the UE 630 and/or one or more wireless communication relays in a data plane. For example, the user-plane CU may handle transport to and from the UE 630 and/or one or more wireless communication relays according to a configuration defined by and/or provided by the control-plane CU function. In some aspects, the CU 622 may communicate with the UE 630 via the DU 624.

In some aspects, the access node 620 (e.g., the user-plane CU function) may include means for receiving configuration information identifying a first flow identifier pertaining to a device, wherein the configuration information further identifies a first tunnel identifier associated with a first tunnel, and wherein the configuration information identifies at least one of a first radio bearer identifier associated with a first radio bearer or a second tunnel identifier associated with a second tunnel, means for providing data, associated with the first flow identifier, in association with the first tunnel identifier and via the first radio bearer or the second tunnel to the device, based at least in part on the first radio bearer identifier or the second tunnel identifier, means for obtaining second configuration information pertaining to a second flow identifier associated with the device, means for providing other data to the device based at least in part on the other data being associated with the second flow identifier, means for obtaining second configuration information for a second flow identifier, wherein the second flow identifier is associated with a second device, means for providing other data to the second device based at least in part on the other data being associated with the second flow identifier, and/or the like. In some aspects, such means may include one or more components of BS 110 and/or UE 120 described in connection with FIG. 2.

In some aspects, the access node 620 (e.g., the control-plane CU function) may include means for receiving a request including a relay identifier for a wireless communication relay and a device identifier for a device, means for selecting at least one of a first radio bearer or a first tunnel, associated with a first tunnel identifier, for communication of data with the device via the wireless communication relay, means for providing, to the wireless communication relay, configuration information for a second radio bearer and a second tunnel associated with a second tunnel identifier, means for providing second configuration information identifying at least one of the first radio bearer or the first tunnel identifier, means for determining user-plane configuration information based at least in part on the configuration information, means for configuring communication of a user-plane central unit of the network node with at least one of the relay or the device using the user-plane configuration information, and/or the like. In some aspects, such means may include one or more components of BS 110 and/or UE 120 described in connection with FIG. 2.

As indicated above, FIGS. 6A and 6B are provided as examples. Other examples are possible and may differ from what was described with regard to FIGS. 6A and 6B.

In a 5G network, such as a millimeter wave (mm Wave) deployment, it may be desirable to have wireless self-backhauling. As used herein, wireless self-backhauling refers to the provision of a backhaul connection between two or more base stations by the two or more base stations themselves using wireless resources of the two or more base stations. Some techniques for wireless self-backhauling have been proposed, but may not provide backhauling across multiple hops.

One approach for providing multi-hop wireless self-backhauling may use a Layer 3 (e.g., routing layer) multi-hop solution. As a layer-3 solution, each wireless communication relay (or hop) may include a respective packet gateway function or a respective User-Plane Function (UPF). With such a solution, core-network signaling may be used whenever a route change occurs on the multi-hop backhaul. Some Layer 2 solutions (e.g., transport layer) have been proposed, but these solutions may include significant modification to an existing CU/DU deployment.

Some techniques and apparatuses described herein may provide a centrally managed, multi-layer tunneling solution to achieve forwarding along a sequence of multiple wireless links using radio bearers. These techniques and apparatuses leverage 3GPP's split-architecture concept, wherein each access node (e.g., base station, gNB, or 5G RAN node) is split into a CU and a DU, as described above. No explicit routing mechanism may need to be introduced to implement techniques and apparatuses described herein, which conserves resources and simplifies implementation in comparison to a Layer 3 solution.

Furthermore, some techniques and apparatuses described herein may provide mechanisms for QoS differentiation on the self-backhaul links. Some techniques and apparatuses described herein may further support redundant paths between a DU and the CU (e.g., to enhance robustness or enable multi-path multiplexing).

Some techniques and apparatuses described herein provide for Layer 2 handling of multi-hop wireless self-backhauling using 3GPP's CU/DU split architecture. In this architecture, each base station or gNB is split into a DU and a CU, as described above. Each wireless communication relay of the backhaul includes a DU and a UE-function (UE-F). A wireless communication relay may use the UE-F to connect to the DU of a parent relay, and may use the DU to connect with child relays or UEs. In this manner, the 5G/NR Uu interface can be reused across the topology.

The wireless communication relay may forward traffic, received from a child relay or UE, to the next-hop parent relay by tunneling this traffic over a radio bearer or wireless link of the UE-F and the parent relay. The parent relay may then forward this traffic to a further parent relay by using another tunnel specific to the parent relay, which creates a multi-layer tunnel.

To allow this multi-layer tunneling to function, each relay may have a mapping between a southbound radio bearer (RB) and a northbound tunnel, as well as a mapping of the northbound tunnel to the encapsulating RB. These mappings are configured by the C-plane CU. For this purpose, the CU caches the configurations with the corresponding device identifiers. A wireless communication relay may obtain a configuration for a new child relay or UE by providing a relay identifier of the relay and a device identifier of the child relay or UE. In this way, forwarding in multi-hop wireless networks via multi-layer tunneling and centralized control is provided.

Figure 7A:
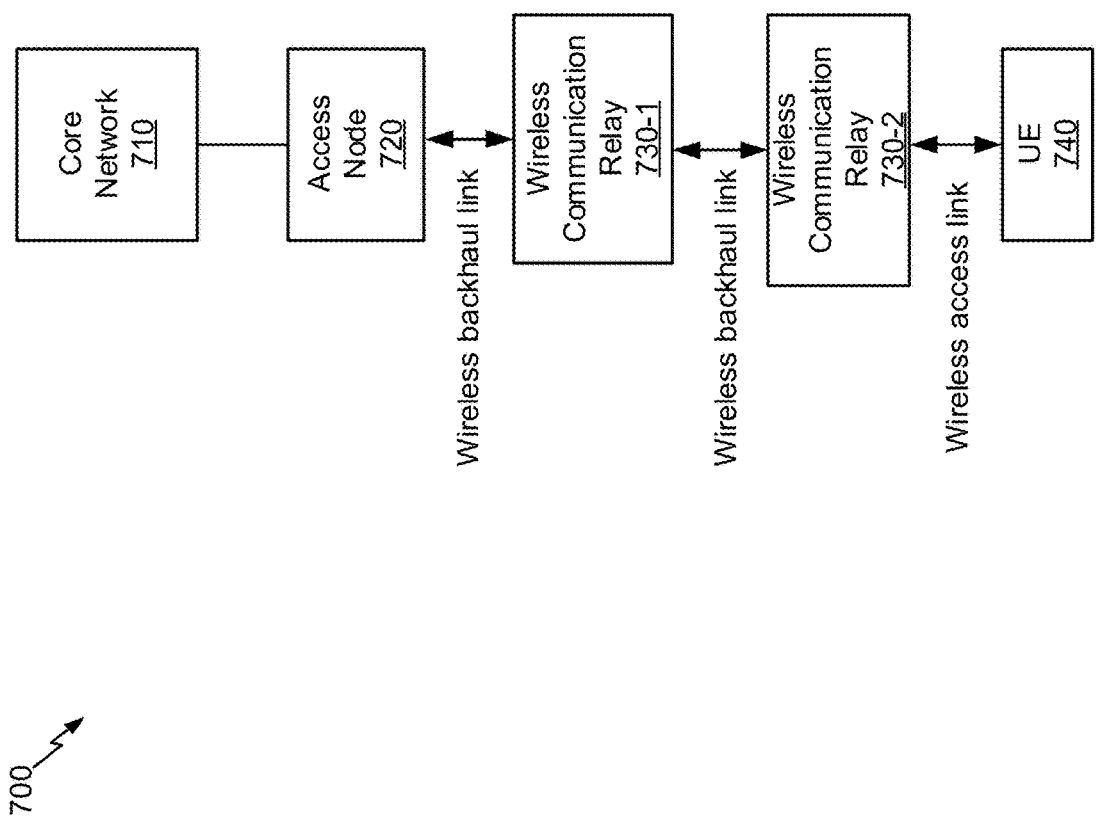
FIGS. 7A and 7B illustrate examples of a wireless communication relay system using access nodes and wireless communication relays, in accordance with various aspects of the present disclosure.
Figure 7B:
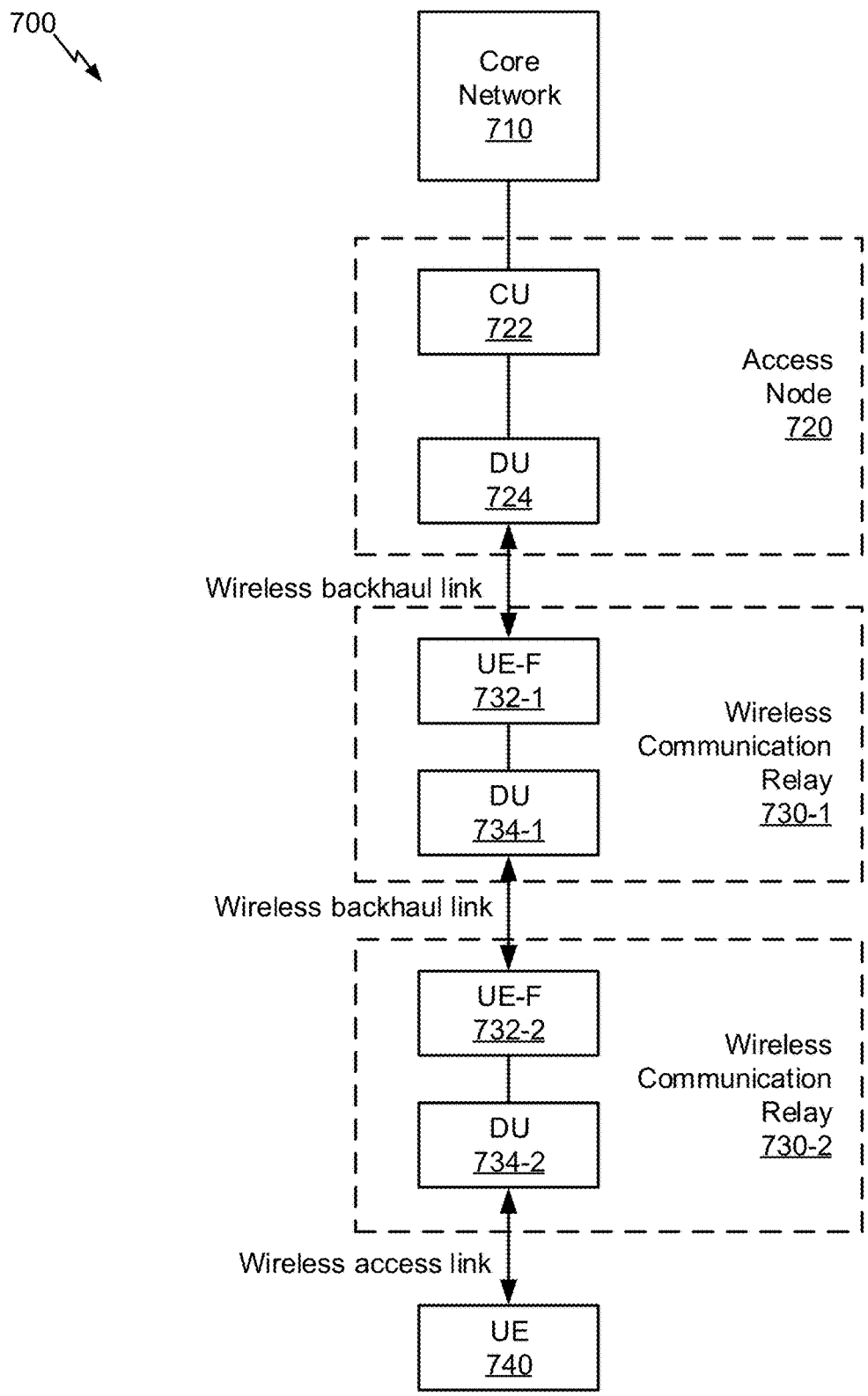

FIGS. 7A and 7B illustrate examples of a wireless communication relay system 700 using access nodes and wireless communication relays, in accordance with various aspects of the present disclosure. As shown in FIGS. 7A and 7B, the wireless communication relay system 700 may include a core network 710, an access node 720, wireless communication relays 730-1 and 730-2, and a UE 740. Core network 710 may include or may be similar to core network 610. Access node 720 is described in more detail with regard to access node 620 of FIG. 6B. UE 740 may include or be similar to UE 630 and/or UE 120.

Wireless communication relay 730 includes one or more devices capable of receiving and providing data via a wireless link. For example, wireless communication relay 730 may include a BS 110, an eNB, a gNB, a UE configured as a base station, a small cell, and/or a similar device. As shown, the usage of wireless communication relays 730 provides wireless backhaul links over multiple hops between access node 720 and UE 740. As further shown, the wireless communication relays 730 may provide a wireless access connection for the UE 740.

The usage of wireless backhaul links for multi-hop deployments may be advantageous over wireline backhaul links in situations with dense deployment of base stations. For example, in a mm Wave deployment, base stations may be deployed densely, which may create problems if wireline backhaul is used. Some techniques and apparatuses described herein provide for deployment of base stations and multiple hops of backhaul across a wireless backhaul between wireless communication relays 730, as described in more detail below.

FIG. 7B shows example modules of access node 720 and wireless communication relay 730. For example, access node 720 may include CU 722 and DU 724, which are described in more detail in connection with CU 622 and DU 624 of FIG. 6B, above.

As further shown, wireless communication relay 730 may include a UE function (UE-F) 732 and a DU 734. DU 734 is similar to DU 724 or DU 624. UE-F 732 may communicate with a DU (e.g., DU 724 of access node 720, DU 734 of another wireless communication relay 730, and/or the like) using interfaces and/or protocols associated with a UE. This allows reuse of access interface procedures for the wireless backhaul links shown in FIGS. 7A and 7B, which simplifies implementation and reduces impact on existing standards and deployments.

In some aspects, CU 722 and DU 724 may communicate with each other via a wireline connection, such as a high capacity fiber connection. The wireless communication relays 730 and the UE 740 may communicate with each other using wireless connections, such as radio bearers, as described in more detail below. In some aspects, one or more DUs of a wireless communication relay (e.g., DU 734) may communicate with CU 722 via a wireline connection. Additionally, or alternatively, one or more DUs of a wireless communication relay 730 may communicate with CU 722 via a wireless link, such as radio bearers associated with the wireless backhaul links shown in FIGS. 7A and 7B.

In this way, a wireless backhaul is provided across multiple, different wireless communication relays so that a UE may communicate with a core network. This communication may be performed without a wireline connection from a wireless communication relay associated with the UE to the core network, which improves versatility of deployment of the wireless network, and which may be particularly advantageous for mm Wave and/or the like. Furthermore, by providing the wireless backhaul links using encapsulating tunnels and encapsulating radio bearers, as described below, higher-level routing and/or adjustment of routing and transport protocols of devices of system 700 may be avoided.

In some aspects, the wireless communication relay 730 may include means for receiving configuration information identifying a first mapping between a first radio bearer and a first tunnel identifier, means for obtaining a second mapping between a second radio bearer and at least one of the first radio bearer or the first tunnel identifier, means for transmitting data, received on the first radio bearer, on the second radio bearer, means for forwarding second data on the first radio bearer, means for receiving second configuration information identifying a third mapping between a third radio bearer and a second tunnel identifier, means for obtaining a fourth mapping between the second radio bearer and the third radio bearer, means for receiving data on the third radio bearer, means for transmitting second data, received on the third radio bearer, on the second radio bearer, means for forwarding third data on the third radio, and/or the like. In some aspects, such means may include one or more components of BS 110 and/or UE 120 described in connection with FIG. 2

As indicated above, FIGS. 7A and 7B are provided as examples. Other examples are possible and may differ from what was described with regard to FIGS. 7A and 7B.

Figure 8A:
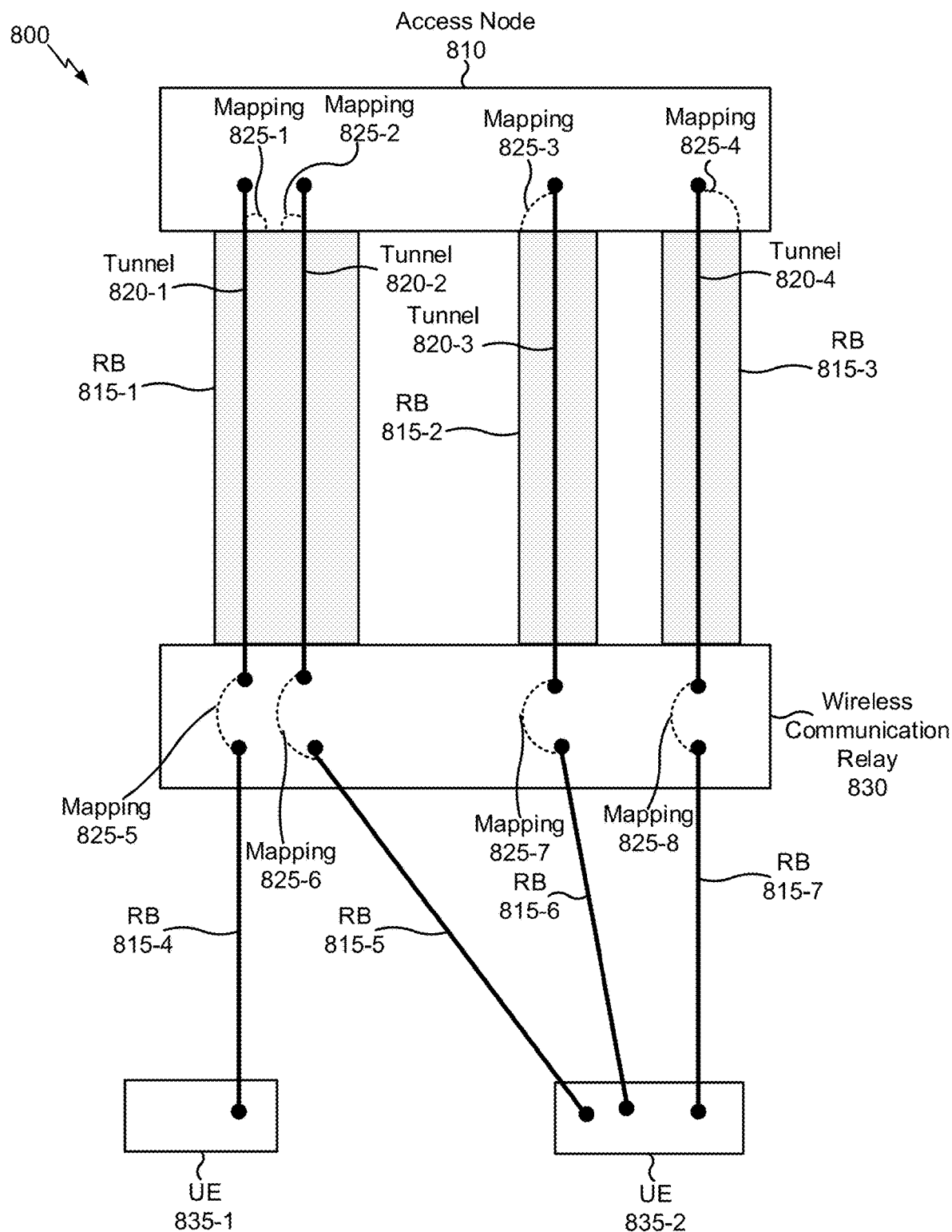
FIGS. 8A and 8B are diagrams illustrating examples of forwarding in a multi-hop wireless network via multi-layer tunneling and centralized control, in accordance with various aspects of the present disclosure.
Figure 8B:
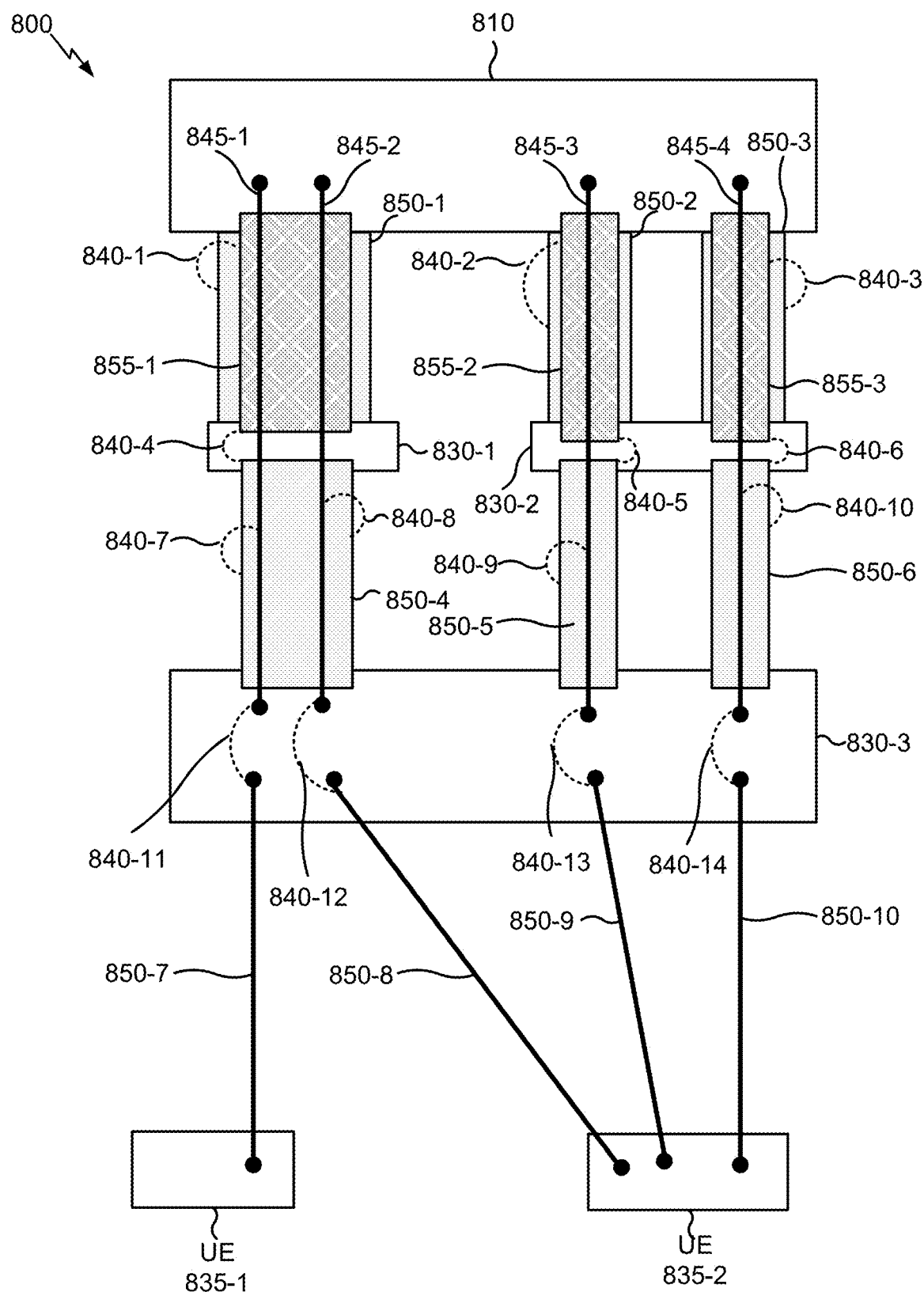

FIGS. 8A and 8B are diagrams illustrating examples of forwarding in multi-hop wireless networks via multi-layer tunneling and centralized control, in accordance with various aspects of the present disclosure. As shown, FIG. 8A includes an access node 810, a wireless communication relay 830, and UEs 835-1 and 835-2. The access node 810 is described in more detail in connection with FIG. 6B (access node 620) and FIGS. 7A and 7B (access node 720). The wireless communication relay 830 is described in more detail in connection with FIGS. 7A and 7B (wireless communication relays 730-1 and 730-2). The UE 835 may include or be similar to, for example, UE 120, UE 630, and/or UE 740.

Devices of example 800 may communicate with each other using radio bearers (shown in FIGS. 8A and 8B as RBs) 815. Each RB 815 may be associated with one or more identifiers. For example, an identifier may include a Radio Network Temporary Identifier (RNTI) pertaining to a UE or UE-F associated with the RB, a logical channel identifier (LCID) pertaining to the RB, and/or the like. As further shown, a wireless communication relay 830 or UE 835 may be associated with multiple, different RBs. For example, a UE may support multiple RBs with a DU to differentiate between C-plane and U-plane traffic and/or to differentiate traffic with different QoS requirements.

As further shown, data may be provided between devices of example 800 using tunnels 820. A tunnel 820 may correspond to a traffic flow between access node 810 (e.g., a CU of access node 810) and a DU of wireless communication relay 830, and may enable access node 810 to differentiate traffic provided via RBs 815. For example, access node 810 may differentiate traffic provided via RB 815-1 based at least in part on tunnel identifiers associated with the traffic, because the tunnel identifiers may indicate whether the traffic is associated with tunnel 820-1 or tunnel 820-2. In some aspects, a traffic flow may be associated with a flow identifier, which may correspond to a particular tunnel identifier for a tunnel. An encapsulating device (e.g., a first-hop device) may use the flow identifier to identify the traffic flow, and may encapsulate the traffic flow according to the corresponding tunnel identifier.

In some aspects, a particular protocol may be used for tunneling. When General Packet Radio Service Tunneling Protocol-User (GTP-U) is used for tunneling, for instance, the GTP-U's Tunnel Endpoint Identifier could be used as a tunnel identifier. Other protocols can also be used to achieve tunneling.

Access node 810 (e.g., a CU of access node 810) can provide information identifying mappings 825 to the wireless communication relay 830 and/or the UE 835. A mapping may identify a correspondence between a tunnel and an RB (e.g., mappings 825-1, 825-2, 825-3, and 825-4 of FIG. 8A), or between a pair of RBs (e.g., mappings 825-5, 825-6, 825-7, 825-8).

The mappings 825 enable provision of data from one end of the system 800 toward another end of the system 800. For example, consider uplink traffic transmitted by UE 835-1, which is provided on RB 815-4. Upon receipt of the traffic, wireless communication relay 830 may determine that RB 815-4 is associated with RB 815-1 and/or tunnel 820-1 based at least in part on mapping 825-5, and may transmit the traffic on RB 815-1 in association with a tunnel identifier of tunnel 820-1 accordingly. Thus, traffic is relayed from UE 835 to access node 810 using tunnels 820 on RBs 815.

FIG. 8B is a diagram of an example of multi-hop wireless backhaul using radio bearers. For the purpose of FIG. 8B, mappings are shown by reference numbers 840-1 through 840-14, tunnels are shown by reference numbers 845-1 through 845-4, and radio bearers are shown by reference number 850-1 through 850-6.

FIG. 8B further shows encapsulating tunnels 855-1, 855-2, and 855-3. An encapsulating tunnel 855 is a tunnel from an intermediate wireless communication relay 830 to an access node 810. As used herein, an intermediate wireless communication relay 830 may be a wireless communication relay that is situated between an access node 810 and another wireless communication relay. An encapsulating tunnel 855 may carry one or more tunnels 845. For example, encapsulating tunnel 855-1 may carry tunnels 845-1 and 845-2. The usage of encapsulating tunnels 855 may enable multi-hop relay using a uniform system of mapping a tunnel to a corresponding RB.

By using multiple, different RBs and multiple, different tunnels, differentiation between traffic may be maintained at the transport layer (e.g., rather than in a higher layer, such as the routing layer). This may provide a performance advantage over differentiation between traffic in higher layers and may not require the introduction of an explicit routing mechanism. Furthermore, the existing CU/DU architecture of access nodes and wireless communication relays is maintained, thereby reducing an impact of implementing the techniques and apparatuses described herein and enabling centralized management using the CU of the access node 810. Furthermore, by supporting multiple RBs on the backhaul link, the wireless communication relay 830 may enable differentiation of C-plane and U-plane traffic and/or traffic pertaining to different QoS classes.

In some aspects, a number of RBs used on a northbound link (e.g., toward access node 810) may not match a number of RBs used on a southbound link. For example, tunnels that map to multiple southbound RBs may be bundled onto a single northbound RB, or tunnels that map to a single southbound RB may be mapped to multiple northbound RBs. In FIG. 8B, for instance, tunnels 845-1 and 845-2 are bundled onto RB 850-4, while tunnels 845-3 and 845-4 are carried by RB 850-5 and RB 850-6, respectively. To enable this transport, the respective wireless communication relays 830 may obtain a mapping from access node 810 that identifies a correspondence between the tunnel identifiers of the tunnels 845 and the corresponding RBs 850.

As an example of routing traffic in the uplink direction, assume that data originates at the UE 835-2. The UE 835-2 may determine that the data is to be transmitted using RB 850-8 (e.g., based at least in part on a rule or condition associated with the UE 835). The wireless communication relay 830-3 (e.g., a DU of the wireless communication relay 830-3) may determine mapping information, including a mapping 840-12, indicating that the RB 850-8 maps to the tunnel 845-2. The wireless communication relay 830-3 may further determine, based at least in part on the mapping 840-8, that the tunnel 845-2 maps to the RB 850-4. Therefore, the wireless communication relay 830-3 may transmit the data, in association with a tunnel identifier for tunnel 845-2, on RB 850-4. The wireless communication relay 830-1 may receive the data. The wireless communication relay 830-1 may determine, based at least in part on the mapping 840-4, that the data received on RB 850-4 is to be transmitted in encapsulating tunnel 855-1. Therefore, the wireless communication relay 830-1 may encapsulate the data in encapsulating tunnel 855-1 (e.g., based at least in part on a tunnel identifier associated with encapsulating tunnel 855-1). Furthermore, the wireless communication relay 830-1 may determine that encapsulating tunnel 855-1 is to be included on RB 850-1 based at least in part on mapping 840-1, and may therefore transmit the data, with tunnel identifiers associated with tunnels 845-2 and 855-1, on RB 850-1. The access node 810 may receive and decapsulate the data.

The access node 810 (e.g., a CU and/or C-plane CU of the access node 810) may configure the topologies shown in FIGS. 8A and 8B. As an example of configuration of such a topology, assume that an access node is to configure a first wireless communication relay (Relay 1) and a second wireless communication relay (Relay 2) to relay data in sequence. The access node may first establish one or more RBs to Relay 1 using procedures as defined for mobile access. This may also establish a C-plane connection between Relay 1 and the access node.

Then, the access node may establish one or more RBs between Relay 2 and Relay 1, and may establish tunnels mapped to the one or more RBs between Relay 1 and the access node. To establish the one or more RBs and the tunnels, the access node may provide configuration information using the C-plane connection to Relay 1. In some aspects, the configuration information may be provided over a radio resource control (RRC) connection, which permits usage of existing UE interfaces. This procedure establishes a C-plane connection to Relay 2. Thus, a C-plane connection is established between Relay 2 and the access node via Relay 1.

Now assume that the access node is to add a third relay (Relay 3) after Relay 2. In such a case, the access node may establish RBs between Relay 3 and Relay 2, and may establish tunnels mapped to such RBs between Relay 2 and Relay 1. The access node may provide configuration information to establish the RBs and the tunnels using the previously-established C-plane connection to Relay 2. Thus, a C-plane connection to Relay 3 is established.

The access node 810 may configure a wireless communication relay 830 using configuration information. For example, the configuration information may identify a mapping between a tunnel identifier (corresponding to a tunnel) and an RB, may identify a configuration of the RB, and may identify the tunnel identifier. In some aspects, the mapping may be determined by the wireless communication relay 830 based at least in part on a policy that defines mapping rules. These mapping rules may be based on the traffic types or traffic priorities carried over an RB, which may be differentiated based at least in part on U-plane traffic, C-plane traffic, QoS class, and/or the like. The mapping rules may also provide selection rules for selecting which of a wireless communication relay's backhaul RBs is to be mapped to a particular tunnel, such as whether an RB is an active RB or a backup RB, an RB priority level, and/or the like.

The configuration information, mapping rules, or polices may be determined by the access node 810 or a centralized control function, such as a C-plane CU. In some aspects, the configuration information, mapping rules, or polices may be obtained based at least in part on (e.g., in response to, in connection with) a request sent to the access node 810 or a centralized control function by a wireless communication relay 830 and/or the like. The request may include a relay identifier, such as an International Mobile Station Identity (IMSI) or a Temporary Mobile Subscriber Identity (e.g., a System Architecture Evolution TMSI (S-TMSI)). The relay identifier may correspond to a wireless communication relay 830 that provided the request. In some aspects, the request may include an identifier corresponding to a child relay or UE (e.g., a downstream wireless communication relay or UE).

After configuration of the wireless communication relays, a U-plane CU of the access node 810 may handle transport of data to or from the wireless communication relays. On the access node, transport to any UE or wireless communication relay may be defined by a configuration of an RB (if the wireless communication relay is first tier or within a single hop of the access node), a tunnel identifier and an encapsulating RB (if the wireless communication relay or UE is second tier or separated from the access node by one hop), or a tunnel identifier and an encapsulating tunnel identifier for all higher-tier wireless communication relays or UEs that are separated from the access node by multiple hops. This configuration may be specified for a particular UE or for a specific traffic type, QoS class, traffic flow, and/or the like.

When the CU contained in the access node is split into a C-plane CU function and a U-plane CU function, the C-plane CU function may provide this configuration for the U-plane CU function. The configuration may include at least one of a tier identifier (e.g., identifying a number of hops between the access node and the UE or wireless communication relay), an RB identifier, and one or more tunnel identifiers. In some aspects, the tunnel identifiers may identify the whole stack of tunnels, which may be useful when the access node resides multiple hops away or is a higher-tier node. In some aspects, the tunnel identifiers may identify the top two tunnel identifiers, and a downstream device may be responsible for identifying mappings between tunnels other than the top two tunnel identifiers.

As indicated above, FIGS. 8A and 8B are provided as examples. Other examples are possible and may differ from what was described with regard to FIGS. 8A and 8B.

Figure 9:
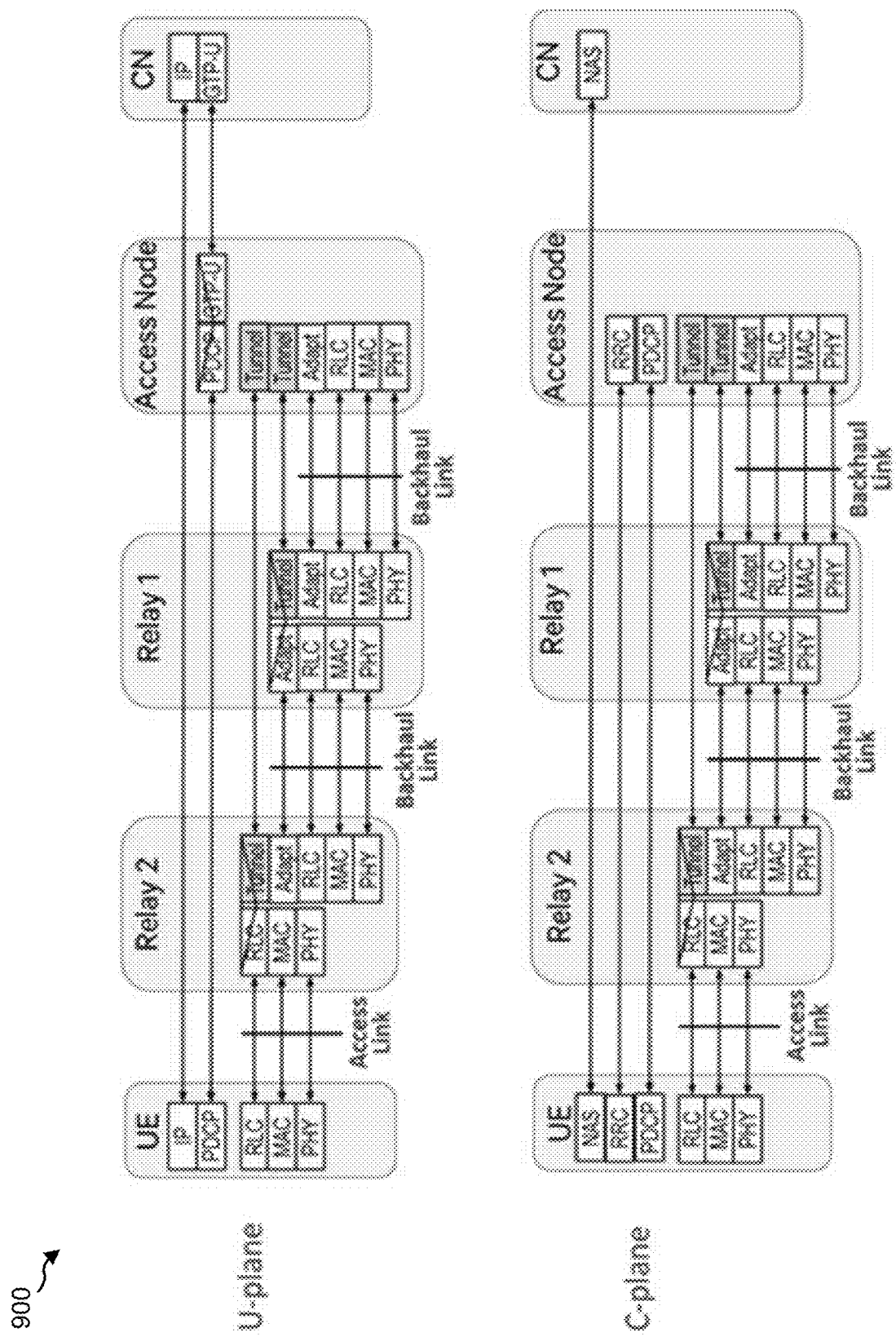
FIG. 9 is a diagram illustrating an example protocol stack for forwarding in a multi-hop wireless network via multi-layer tunneling and centralized control, in accordance with various aspects of the present disclosure.

FIG. 9 is a diagram 900 illustrating example protocol stacks for forwarding in a multi-hop wireless network via multi-layer tunneling and centralized control, in accordance with various aspects of the present disclosure. FIG. 9 shows a user-plane (U-plane) set of protocol stacks and a control-plane (C-plane) set of protocol stacks. The protocol stacks shown in FIG. 9 may apply in a situation wherein a first wireless communication relay (e.g., Relay 1) forwards communications between an access node and a second wireless communication relay (e.g., Relay 2) using one tunnel from the access node to Relay 2, and an encapsulating tunnel from the access node to Relay 1 that contains the tunnel.

As shown in FIG. 9, physical (PHY)/MAC/RLC may represent the protocol stack for each radio bearer. In some aspects, a protocol stack may include an Adapt layer (e.g., for backhaul RB protocol stacks). The Adapt layer may support additional per-hop security. As shown, in some aspects, the tunnel layer may use GTP-U or a stack of GTP-U/User Datagram Protocol (UDP)/IP on the U-plane. Additionally, or alternatively, F1-User (F1-U), which has been developed for the CU/DU split architecture, may be used.

On the C-plane, the tunnel layer may use the same protocol as the U-plane. Additionally, or alternatively, another encapsulation or protocol can be used. For example, F1-Control (F1-C), which contains F1 Application Protocol, Stream Control Transmission Protocol, and IP, may be used.

As indicated above, FIG. 9 is provided as an example. Other examples are possible and may differ from what was described with regard to FIG. 9.

Figure 10:
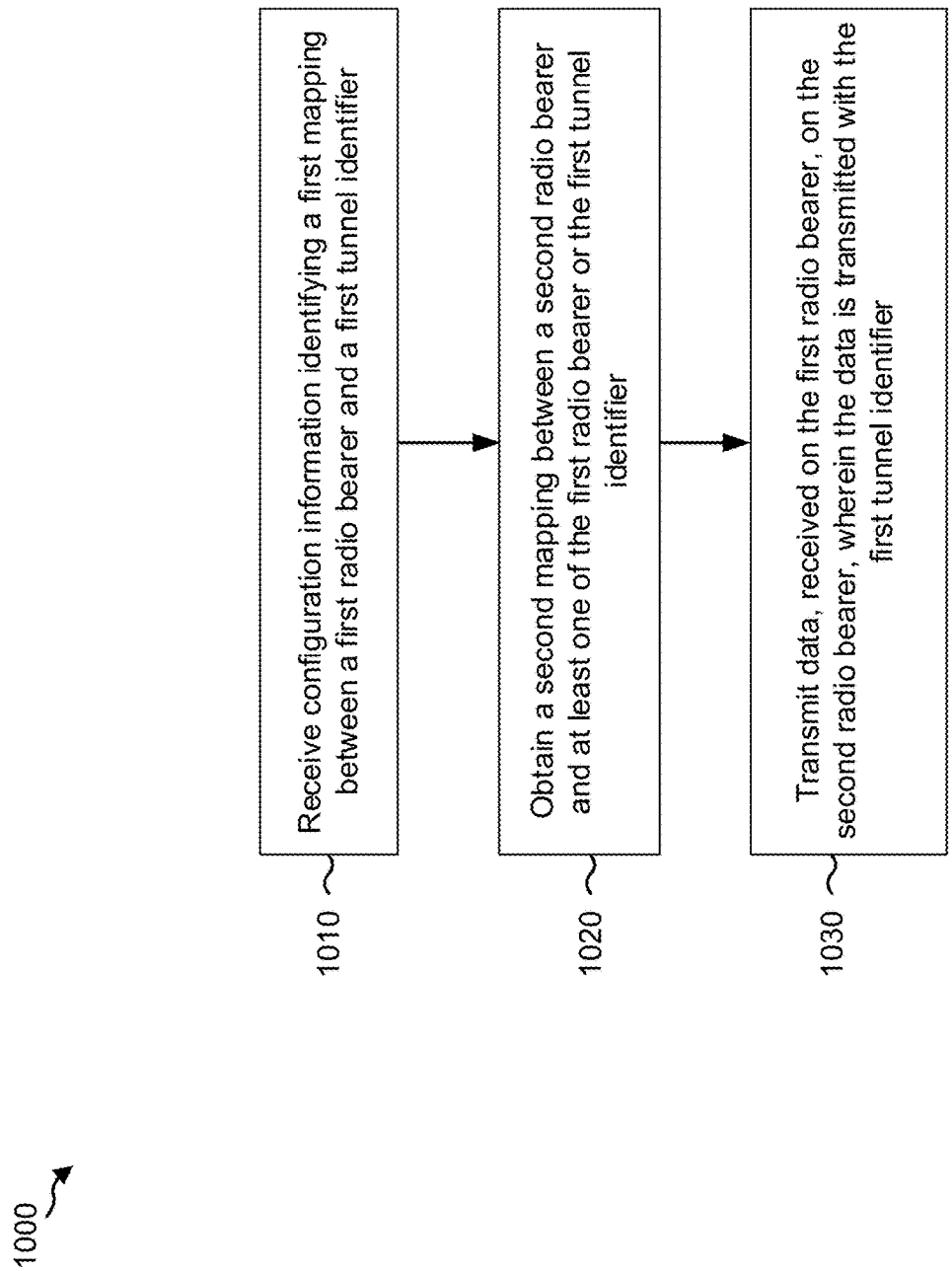
FIG. 10 is a diagram illustrating an example process performed, for example, by a wireless communication relay, in accordance with various aspects of the present disclosure.

FIG. 10 is a diagram illustrating an example process 1000 for wireless communication performed, for example, by a wireless communication relay, in accordance with various aspects of the present disclosure. Example process 1000 is an example where a wireless communication relay (e.g., wireless communication relay 730, 830) performs forwarding in a multi-hop network via multi-layer tunneling and centralized control.

As shown in FIG. 10, in some aspects, process 1000 may include receiving configuration information identifying a first mapping between a first radio bearer and a first tunnel identifier (block 1010). For example, the wireless communication relay (e.g., using antenna 234, DEMOD 232, MIMO detector 236, receive processor 238, controller/processor 240, and/or the like) may receive configuration information (e.g., from a control-plane CU of an access node and/or the like). The configuration information may identify a first mapping between a first radio bearer and a first tunnel identifier.

As shown in FIG. 10, in some aspects, process 1000 may include obtaining a second mapping between a second radio bearer and at least one of the first radio bearer or the first tunnel identifier (block 1020). For example, the wireless communication relay may obtain (e.g., using controller/processor 240 and/or the like) a second mapping (e.g., may obtain the second mapping from the access node, or may determine the second mapping). The second mapping may identify a mapping between a second radio bearer and at least one of the first radio bearer or the first tunnel identifier.

As shown in FIG. 10, in some aspects, process 1000 may include transmitting data, received on the first radio bearer, on the second radio bearer, wherein the data is transmitted with the first tunnel identifier (block 1030). For example, the wireless communication relay (e.g., using controller/processor 240, transmit processor 220, TX MIMO processor 230, MOD 232, antenna 234, and/or the like) may transmit, on the second radio bearer, data received on the first radio bearer. In some aspects, the data may be transmitted with the first tunnel identifier. For example, the wireless communication relay may encapsulate the data with the first tunnel identifier, or may add the first tunnel identifier to a tunnel header of the data.

In some aspects, the configuration information is received based at least in part on a request that includes a relay identifier corresponding to the wireless communication relay. In some aspects, the first radio bearer is associated with at least one of an access link, a backhaul link, or a fronthaul link, and the second radio bearer is associated with at least one of a backhaul link or a fronthaul link. In some aspects, the data is first data, and the wireless communication relay may forward second data on the first radio bearer, wherein the second data is associated with the first tunnel identifier and is received on the second radio bearer. In some aspects, the second radio bearer is configured based at least in part on a configuration message or a determination by the wireless communication relay, wherein the determination is based at least in part on a policy or rule. In some aspects, the policy or rule relates to at least one of a traffic type, a traffic class, a bearer priority, or a bearer activity. In some aspects, information identifying the policy or rule is received on a radio bearer.

In some aspects, the first radio bearer and the second radio bearer use a frame structure that is synchronized between the first radio bearer and the second radio bearer. In some aspects, information received on the first radio bearer pertains to an uplink and information received on the second radio bearer pertains to a downlink. In some aspects, the configuration information is first configuration information and the data is first data. The wireless communication relay may receive second configuration information identifying a third mapping between a third radio bearer and a second tunnel identifier, obtain a fourth mapping between the second radio bearer and the third radio bearer, receive data on the third radio bearer, and transmit second data, received on the third radio bearer, on the second radio bearer, wherein the second data is transmitted in association with the second tunnel identifier.

In some aspects, the third radio bearer is associated with a different wireless link than the first radio bearer or the second radio bearer. In some aspects, the wireless communication relay may forward third data on the third radio bearer, wherein the third data is associated with the second tunnel identifier and is received on the second radio bearer.

In some aspects, the first data is associated with a different priority or quality of service class than the second data. In some aspects, the first data is associated with a different plane, of a control plane and a data plane, than the second data. In some aspects, the configuration information is received over a radio resource control (RRC) connection. In some aspects, the first radio bearer and the second radio bearer are identified by respective logical channel identifiers, and a link associated with at least one of the first radio bearer or the second radio bearer is identified by a radio network temporary identifier. In some aspects, the first tunnel identifier is associated with at least one of a General Packet Radio Service Tunneling Protocol-User (GTP-U) protocol or an F1 Application Protocol. In some aspects, the first radio bearer is associated with a first formed beam and the second radio bearer is associated with a second formed beam.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
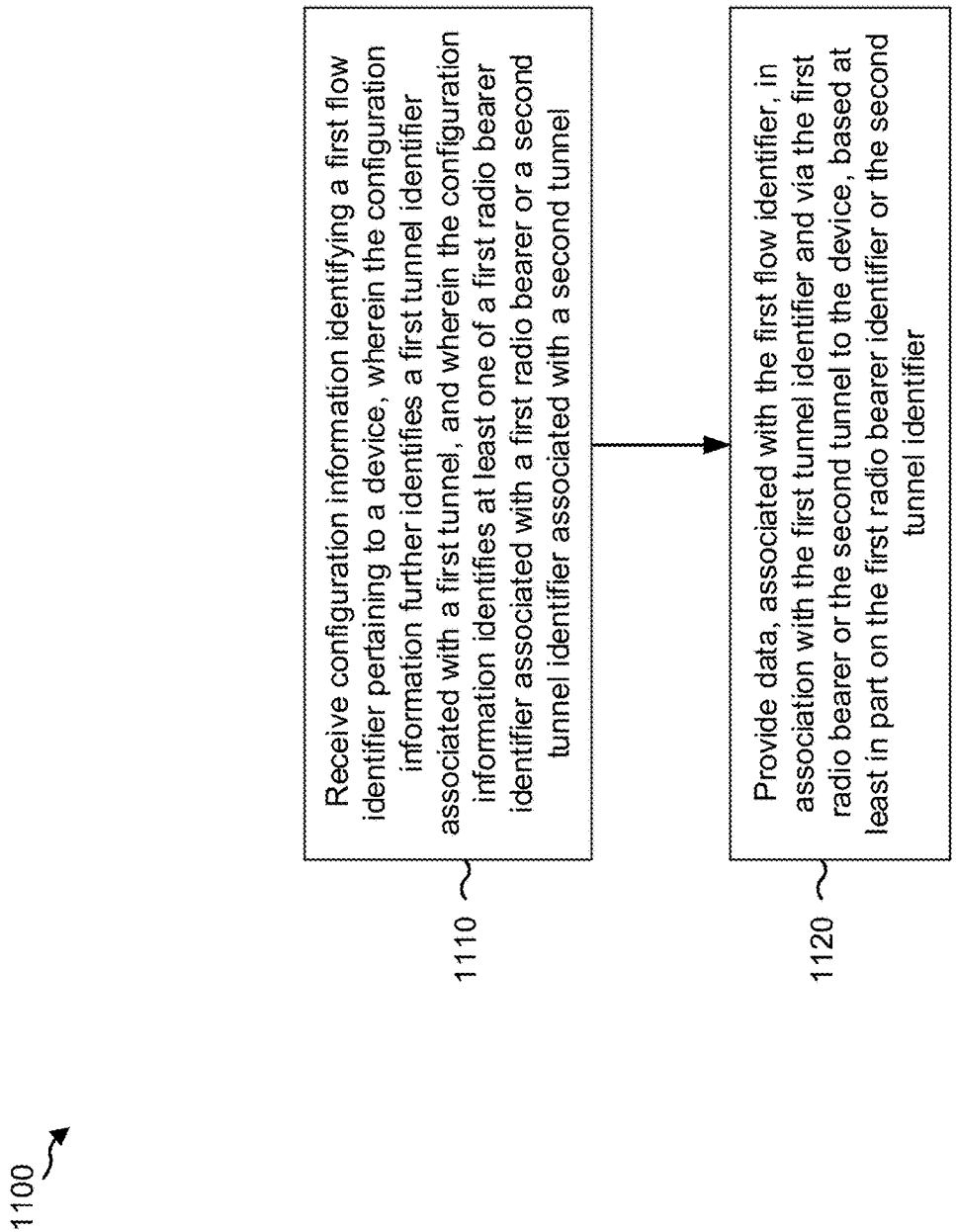
FIG. 11 is a diagram illustrating an example process performed, for example, by a network node, in accordance with various aspects of the present disclosure.

FIG. 11 is a diagram illustrating an example process 1100 for wireless communication performed, for example, by a network node, in accordance with various aspects of the present disclosure. Example process 1100 is an example where a network node, such as a user-plane CU (e.g., a user-plane CU of access node 620, 720, 810), performs forwarding in multi-hop networks via multi-layer tunneling and centralized control.

As shown in FIG. 11, in some aspects, process 1100 may include receiving configuration information identifying a first flow identifier pertaining to a device, wherein the configuration information further identifies a first tunnel identifier associated with a first tunnel, and wherein the configuration information identifies at least one of a first radio bearer identifier associated with a first radio bearer or a second tunnel identifier associated with a second tunnel (block 1110). For example, the network node (e.g., using antenna 234, DEMOD 232, MIMO detector 236, receive processor 238, controller/processor 240, and/or the like) may receive configuration information (e.g., from a control-plane CU of the access node 620, 720, 810). The configuration information may identify a first flow identifier pertaining to a device or traffic flow and a first tunnel identifier associated with a first tunnel. In some aspects, the configuration information may identify at least one of a first radio bearer identifier associated with a first radio bearer, or a second tunnel identifier associated with a second tunnel (e.g., an encapsulating tunnel).

As shown in FIG. 11, in some aspects, process 1100 may include providing data, associated with the first flow identifier, in association with the first tunnel identifier and via the first radio bearer or the second tunnel to the device, based at least in part on the first radio bearer identifier or the second tunnel identifier (block 1120). For example, the network node (e.g., using controller/processor 240 and/or the like) may provide data, associated with the first flow identifier (e.g., associated with the device or the traffic flow), in association with the first tunnel identifier and via the first radio bearer or the second tunnel. The network node may provide the data to the device based at least in part on the first radio bearer identifier or the second tunnel identifier.

In some aspects, the device is at least one of a user equipment or a wireless communication relay. In some aspects, the configuration information is first configuration information, and the network node obtains second configuration information pertaining to a second flow identifier associated with the device and provides other data to the device based at least in part on the other data being associated with the second flow identifier. In some aspects, the configuration information is first configuration information and the device is a first device, and the network node obtains second configuration information for a second flow identifier, wherein the second flow identifier is associated with a second device. The network node may provide other data to the second device based at least in part on the other data being associated with the second flow identifier. In some aspects, the configuration information identifies a plurality of tunnel identifiers, and the network node may provide the data in association with the plurality of tunnel identifiers. In some aspects, the data is provided on a downlink of a radio bearer.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 for wireless communication performed, for example, by a network node, in accordance with various aspects of the present disclosure. Example process 1200 is an example where a network node such as a control-plane CU (e.g., a control-plane CU of access node 620, 720, 810) performs forwarding in multi-hop networks via multi-layer tunneling and centralized control.

As shown in FIG. 12, in some aspects, process 1200 may include receiving a request including a relay identifier for a wireless communication relay and a device identifier for a device (block 1210). For example, the network node (e.g., using antenna 234, DEMOD 232, MIMO detector 236, receive processor 238, controller/processor 240, and/or the like) may receive a request (e.g., from a wireless communication relay). The request may include a relay identifier for a wireless communication relay and a device identifier for a device (e.g., a downstream wireless communication relay or UE).

As shown in FIG. 12, in some aspects, process 1200 may include selecting at least one of a first radio bearer or a first tunnel, associated with a first tunnel identifier, for communication of data with the device via the wireless communication relay (block 1220). For example, the network node (e.g., using controller/processor 240 and/or the like) may select at least one of a first radio bearer or a first tunnel for communication of data with the device via the wireless communication relay. The first tunnel may be associated with a first tunnel identifier.

As shown in FIG. 12, in some aspects, process 1200 may include providing, to the wireless communication relay, configuration information for a second radio bearer and a second tunnel associated with a second tunnel identifier, wherein the wireless communication relay is configured to communicate the data from at least one of the first radio bearer or the first tunnel to at least one of the second radio bearer or the second tunnel (block 1230). For example, the network node (e.g., using controller/processor 240, transmit processor 220, TX MIMO processor 230, MOD 232, antenna 234, and/or the like) may provide configuration information for a second radio bearer and a second tunnel associated with a second tunnel identifier. The wireless communication relay may be configured to communicate the data from at least one of the first radio bearer or the first tunnel to at least one of the second radio bearer or the second tunnel.

In some aspects, the configuration information is first configuration information that is stored by the network node in association with the device identifier. The network node may provide second configuration information identifying at least one of the first radio bearer or the first tunnel identifier. In some aspects, the network node may determine user-plane configuration information based at least in part on the configuration information, and may configure communication of a user-plane central unit of the network node with at least one of the relay or the device using the user-plane configuration information.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication relay, comprising:
receiving first configuration information identifying a first mapping between a first radio bearer and a first tunnel identifier;
obtaining a second mapping between a second radio bearer and at least one of the first radio bearer or the first tunnel identifier;
transmitting first data, received on the first radio bearer, on the second radio bearer,
wherein the first data is transmitted with the first tunnel identifier;
receiving second configuration information identifying a third mapping between a third radio bearer and a second tunnel identifier; and
transmitting second data, received on the third radio bearer, on the second radio bearer.

2. The method of claim 1, wherein the first configuration information is received based at least in part on a request that includes a relay identifier corresponding to the wireless communication relay.

3. The method of claim 1, wherein the first radio bearer is associated with at least one of an access link, a backhaul link, or a fronthaul link; and
wherein the second radio bearer is associated with at least one of a backhaul link or a fronthaul link.

4. The method of claim 1, wherein the data is first data; and
wherein the method further comprises forwarding second data on the first radio bearer,
wherein the second data is associated with the first tunnel identifier and is received on the second radio bearer.

5. The method of claim 1, wherein the second radio bearer is configured based at least in part on a configuration message or a determination by the wireless communication relay,
wherein the determination is based at least in part on a policy or rule.

6. The method of claim 5, wherein the policy or rule relates to at least one of a traffic type, a traffic class, a bearer priority, or a bearer activity.

7. The method of claim 5, wherein information identifying the policy or rule is received on a radio bearer.

8. The method of claim 1, wherein the first radio bearer and the second radio bearer use a frame structure that is synchronized between the first radio bearer and the second radio bearer.

9. The method of claim 1, wherein information received on the first radio bearer pertains to an uplink and information received on the second radio bearer pertains to a downlink.

10. The method of claim 1,
wherein the method further comprises:
obtaining a fourth mapping between the second radio bearer and the third radio bearer; and
receiving the second data on the third radio bearer; and
wherein the second data is transmitted in association with the second tunnel identifier.

11. The method of claim 1, wherein the third radio bearer is associated with a different wireless link than the first radio bearer or the second radio bearer.

12. The method of claim 1, further comprising forwarding third data on the third radio bearer,
wherein the third data is associated with the second tunnel identifier and is received on the second radio bearer.

13. The method of claim 1, wherein the first data is associated with a different priority or quality of service class than the second data.

14. The method of claim 1, wherein the first data is associated with a different plane, of a control plane and a data plane, than the second data.

15. The method of claim 1, wherein the first configuration information is received over a radio resource control (RRC) connection.

16. The method of claim 1, wherein the first radio bearer and the second radio bearer are identified by respective logical channel identifiers, and wherein a link associated with at least one of the first radio bearer or the second radio bearer is identified by a radio network temporary identifier.

17. The method of claim 1, wherein the first tunnel identifier is associated with at least one of a General Packet Radio Service Tunneling Protocol-User (GTP-U) protocol or an F1 Application Protocol.

18. The method of claim 1, wherein the first radio bearer is associated with a first formed beam and the second radio bearer is associated with a second formed beam.

19. A method of wireless communication performed by a network node, comprising:
receiving first configuration information identifying a first flow identifier pertaining to a device, wherein the first configuration information further identifies a first tunnel identifier associated with a first tunnel, and wherein the first configuration information identifies at least one of a first radio bearer identifier associated with a first radio bearer or a second tunnel identifier associated with a second tunnel;
providing data, associated with the first flow identifier, in association with the first tunnel identifier and via the first radio bearer or the second tunnel to the device, based at least in part on the first radio bearer identifier or the second tunnel identifier;
identifying second configuration information pertaining to a second flow identifier; and
providing other data based at least in part on the other data being associated with the second flow identifier.

20. The method of claim 19, wherein the device is at least one of a user equipment or a wireless communication relay.

21. The method of claim 19,
wherein the second flow identifier is associated with the device.

22. The method of claim 19, wherein the device is a first device; and
wherein the second flow identifier is associated with a second device.

23. The method of claim 19, wherein the first configuration information identifies a plurality of tunnel identifiers; and
wherein providing the data comprises providing the data in association with the plurality of tunnel identifiers.

24. The method of claim 19, wherein the data is provided on a downlink of a radio bearer.

25. A method of wireless communication performed by a network node, comprising:
receiving a request including a relay identifier for a wireless communication relay and a device identifier for a device;
selecting at least one of a first radio bearer or a first tunnel, associated with a first tunnel identifier, for communication of data with the device via the wireless communication relay;
providing, to the wireless communication relay, first configuration information for a second radio bearer and a second tunnel associated with a second tunnel identifier,
wherein the wireless communication relay is configured to communicate the data from at least one of the first radio bearer or the first tunnel to at least one of the second radio bearer or the second tunnel; and
providing second configuration information identifying at least one of the first radio bearer or the first tunnel identifier.

26. The method of claim 25, wherein the first configuration information is stored by the network node in association with the device identifier.

27. The method of claim 25, further comprising:
determining user-plane configuration information based at least in part on the first configuration information; and
configuring communication of a user-plane central unit of the network node with at least one of the wireless communication relay or the device using the user-plane configuration information.

28. A wireless communication relay, comprising:
a memory; and
one or more processors operatively coupled to the memory, the memory and the one or more processors configured to:
receive first configuration information identifying a first mapping between a first radio bearer and a first tunnel identifier;
obtain a second mapping between a second radio bearer and at least one of the first radio bearer or the first tunnel identifier;
transmit first data, received on the first radio bearer, on the second radio bearer,
wherein the first data is transmitted with the first tunnel identifier;
receive second configuration information identifying a third mapping between a third radio bearer and a second tunnel identifier; and
transmit second data, received on the third radio bearer, on the second radio bearer.

29. The wireless communication relay of claim 28, wherein the first configuration information is received based at least in part on a request that includes a relay identifier corresponding to the wireless communication relay.

30. The wireless communication relay of claim 28, wherein the first radio bearer is associated with at least one of an access link, a backhaul link, or a fronthaul link, and wherein the second radio bearer is associated with at least one of a backhaul link or a fronthaul link.

* * * * *